(12) United States Patent
Georgiev et al.

(10) Patent No.: US 10,941,838 B2
(45) Date of Patent: Mar. 9, 2021

(54) BEARINGLESS PLANETARY GEARBOX

(71) Applicant: California Institute of Technology, Pasadena, CA (US)

(72) Inventors: Nikola Z. Georgiev, Pasadena, CA (US); Joel W. Burdick, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 75 days.

(21) Appl. No.: 15/945,098

(22) Filed: Apr. 4, 2018

(65) Prior Publication Data
US 2018/0283503 A1 Oct. 4, 2018

Related U.S. Application Data

(60) Provisional application No. 62/481,239, filed on Apr. 4, 2017.

(51) Int. Cl.
*F16H 3/56* (2006.01)
*F16H 57/08* (2006.01)
(Continued)

(52) U.S. Cl.
CPC ................ *F16H 3/56* (2013.01); *F16H 1/28* (2013.01); *F16H 57/082* (2013.01); *H02K 1/146* (2013.01);
(Continued)

(58) Field of Classification Search
CPC ..... F16H 3/54; F16H 3/56; F16H 1/28; F16H 2001/2881; F16H 2001/2872; H02K 1/278; H02K 1/2786; H02K 7/116
See application file for complete search history.

(56) References Cited

U.S. PATENT DOCUMENTS 3,675,510 A * 7/1972 Duggar, Jr. ............... F16H 1/46
475/342
4,280,376 A * 7/1981 Rosen ....................... F16H 1/46
475/342

(Continued)

FOREIGN PATENT DOCUMENTS

EP 0627575 A1 * 12/1994 ........... F16H 1/2863

OTHER PUBLICATIONS

Folenta, "Design Study of Self-Aligning Bearingless Planetary Gear (SABP)", retrieved from www.nasa.gov (Year: 1983).*
(Continued)

*Primary Examiner* — Stacey A Fluhart
(74) *Attorney, Agent, or Firm* — Gates & Cooper LLP

(57) ABSTRACT

A planetary gearbox including a first sun gear; a first ring gear; a first set of planet gears meshing with the first sun gear and the first ring gear; a second sun gear; a second ring gear; a second plurality of planet gears meshing with the second ring gear and the second sun gear, wherein the $i^{th}$ gear in the first set of planet gears is fixed to the $i^{th}$ gear in the second set of planet gears so that the gears in the first set and the second set rotate together coaxially. The resulting planetary gearbox can be readily integrated into compact robotic joints. Its few lightweight components can be manufactured with high accuracy with standard machining techniques.

20 Claims, 29 Drawing Sheets

(51) Int. Cl.
*H02K 1/14* (2006.01)
*F16H 1/28* (2006.01)
*H02K 7/116* (2006.01)
*H02K 1/27* (2006.01)

(52) U.S. Cl.
CPC ........... *H02K 1/278* (2013.01); *H02K 1/2786* (2013.01); *H02K 7/116* (2013.01); *F16H 2001/2872* (2013.01); *F16H 2057/087* (2013.01); *F16H 2200/2002* (2013.01)

(56) References Cited

U.S. PATENT DOCUMENTS

| | | | | |
|---|---|---|---|---|
| 4,882,943 | A | * | 11/1989 | Pipon .................... F16H 1/2863 74/409 |
| 5,409,431 | A | * | 4/1995 | Vranish ................. F16H 1/2863 475/342 |
| 5,540,630 | A | * | 7/1996 | Vranish ................. F16H 1/2863 475/338 |
| 5,711,736 | A | * | 1/1998 | Kyodo .................... F16H 13/06 475/149 |
| 8,016,893 | B2 | | 9/2011 | Weinberg et al. |

OTHER PUBLICATIONS

Machine translation of EP-0627575-A1, retrieved from www.espacenet.com on Dec. 3, 2019 (Year: 2019).*
Seok, S., et al., "Actuator Design for High Force Proprioceptive Control in Fast Legged Locomotion", 2012 IEEE/RSJ International Conference on Intelligent Robots and Systems, Oct. 7-12, 2012. Vilamoura, Algarve, Portugal, pp. 1970-1975.
Ueura, K., et al., "Development of the Harmonic Drive Gear for Space Applications", Space Mechanisms and Tribology, Proceedings of the 8th European Symposium, 1999, vol. 438, pp. 259-264.
Shorbel, F.H., et al., "On the Kinematic Error in Harmonic Drive Gears", Transactions of the ASME, Mar. 2001, pp. 90-97, vol. 123.
Dhaouadi, R., et al., "Modeling and Analysis of Hysteresis in Harmonic Drive Gears", Systems Analysis Model Simul., 2003, pp. 1-14.
Seyfferth, W., et al., "Nonlinear Modeling and Parameter Identification of Harmonic Drive Robotic Transmissions", IEEE International Conference on Robotics and Automation, 1995, pp. 3027-3032.
Tuttle, T.D., et al., "Modeling a Harmonic Drive Gear Transmission", IEEE, 1993, pp. 624-629.
Yang, D.C.H., et al., "Design and Application Guidelines for Cycloid Drives with Machining Tolerances", Mech. Mach. Theory, 1990, pp. 487-501, vol. 25, No. 5.
Sensinger, J.W., "Unified Approach to Cycloid Drive Profile, Stress, and Efficiency Optimization", Journal of Mechanical Design, Feb. 2010, pp. 024503-1-024503-5, vol. 132.
Seweryn, K., et al., "Optimization of the Robotic Joint Equipped With Epicyloidal Gear and Direct Drive for Space Applications", 15th European Space Mechanisms & Tribology Symposium—ESMATS 2013, Noordwijk, The Netherlands, Sep. 25-27, 2013, pp. 1-7, vol. 718.
Brassitos, E., et al., "Kinematics Analysis and Design Considerations of the Gear Bearing Drive", Adv. in Mech., Rob. & Des. Educ. & Res., 2013, MMS 14, pp. 159-175.
Brassitos, E., et al., "Compact Drive System for Planetary Rovers and Space Manipulators", 2015 IEEE International Conference on Advanced Intelligent Mechatronics (AIM), Jul. 7-11, 2015. Busan, Korea, pp. 664-669.
Georgiev, N., et al., "Design and Analysis of the Bearingless Planetary Gearbox", 2017 IEEE/RSJ International Conference on Intelligent Robots and Systems (IROS), Sep. 24-28, 2017, Vancouver, BC, Canada, pp. 1987-1994.
KHK Gears, Gear Technical Reference, http://khkgears.net/.
Krishnan, R., "Permanent Magnet Synchronous and Brushless DC Motor Drives" CRC Press, 2010.
Grote, A. (Eds.), "Springer Handbook of Mechanical Engineering", 2009.
Budynas, R., et al., "Shigley's Mechanical Engineering Design", McGraw Hill, 2011.

* cited by examiner

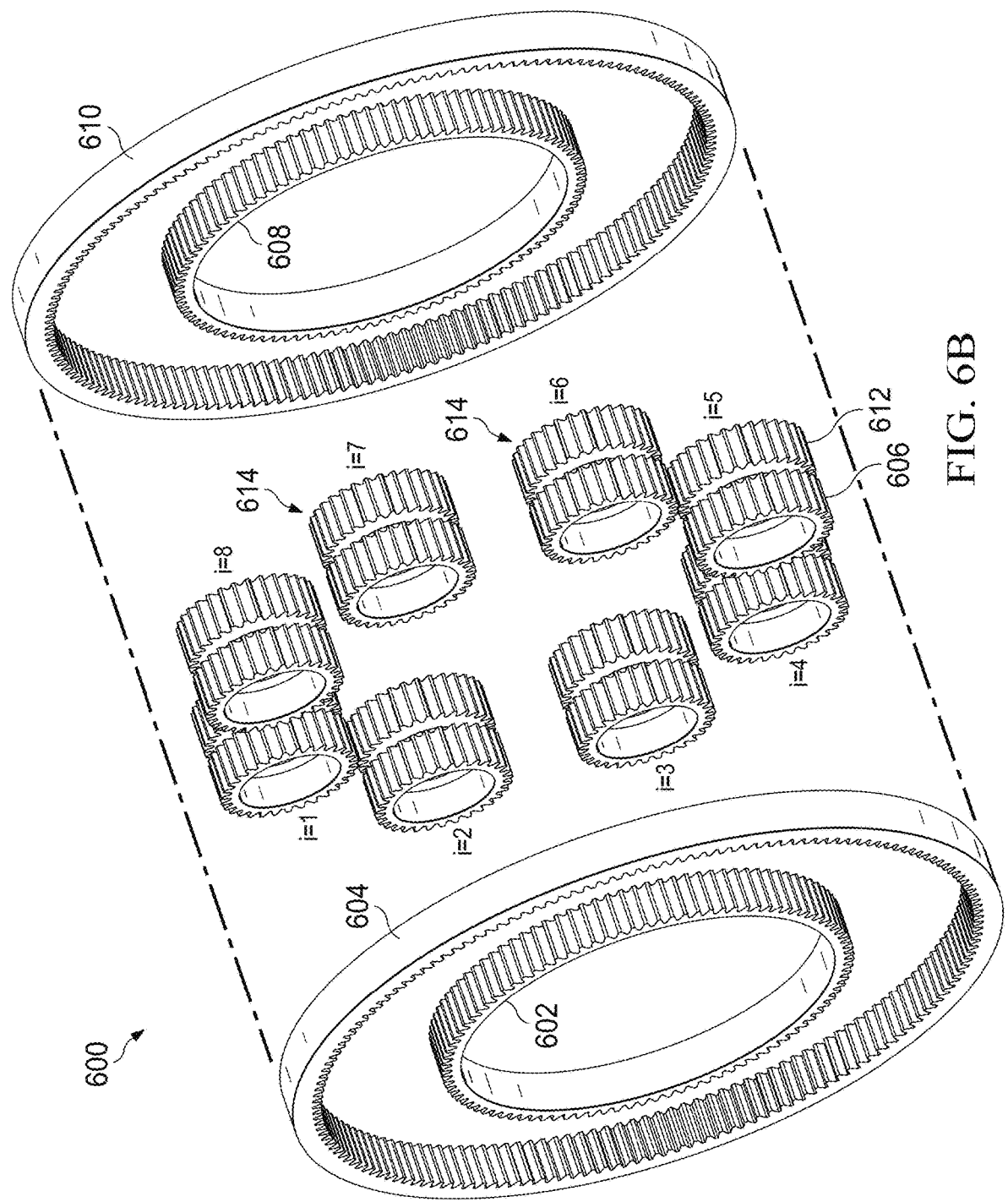

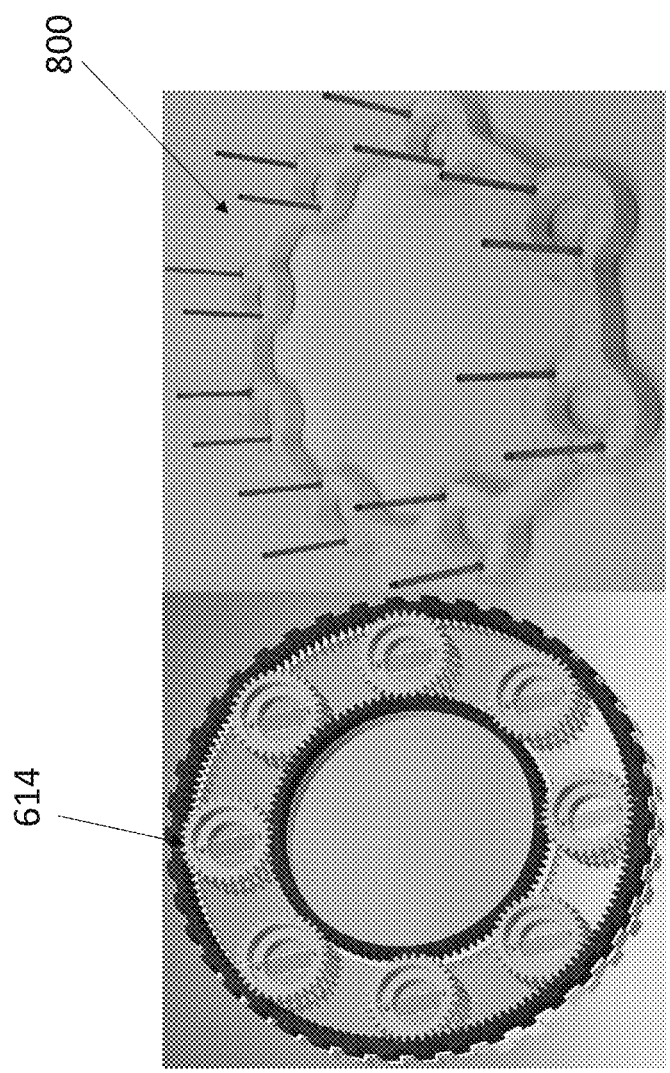

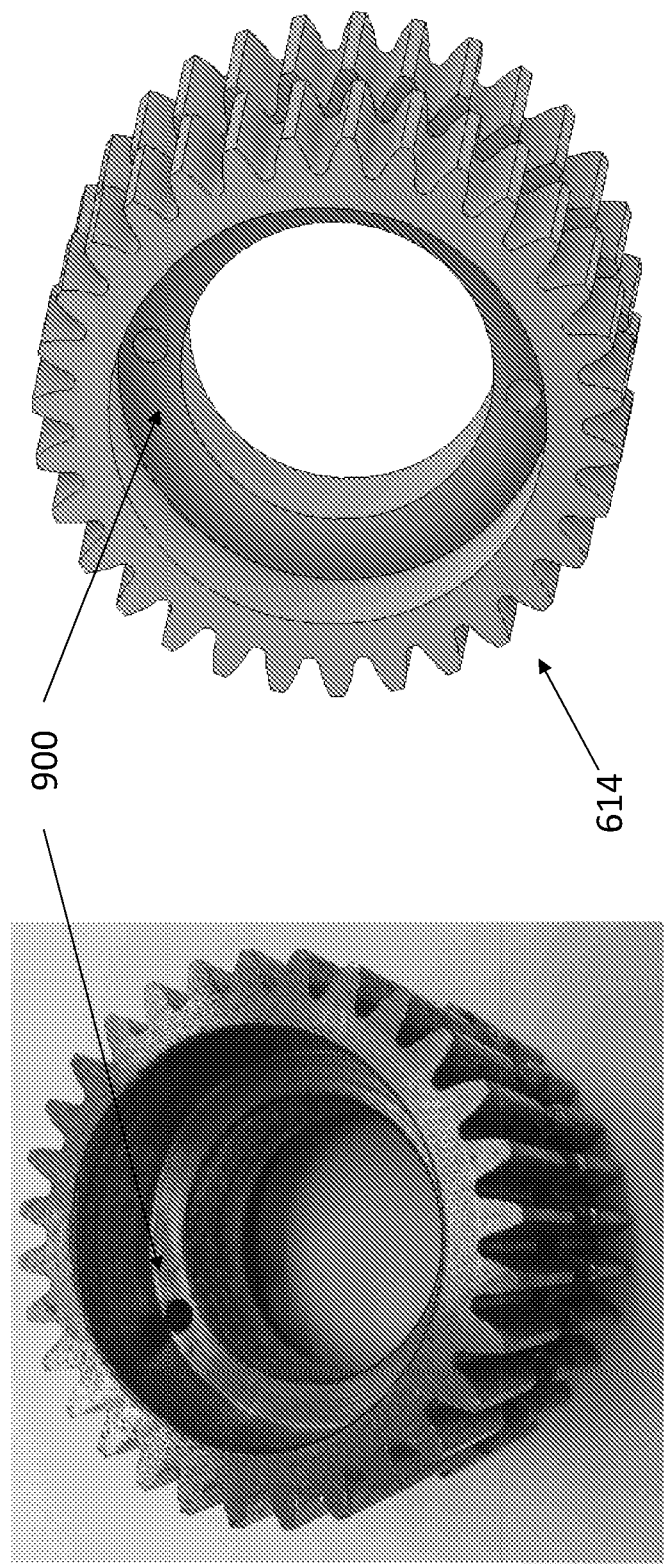

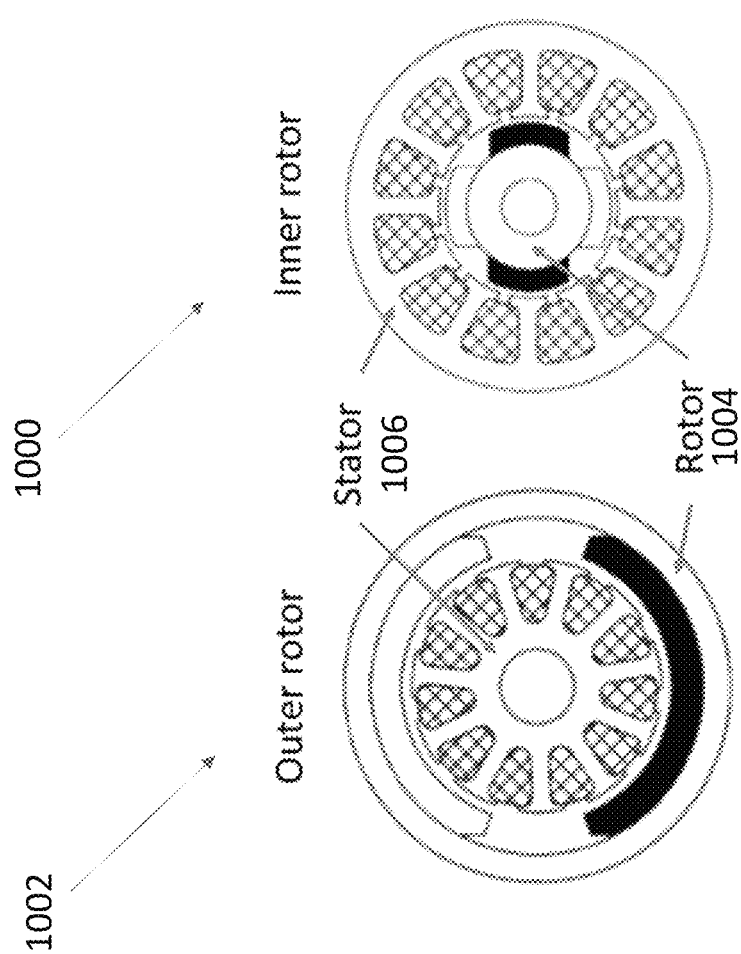

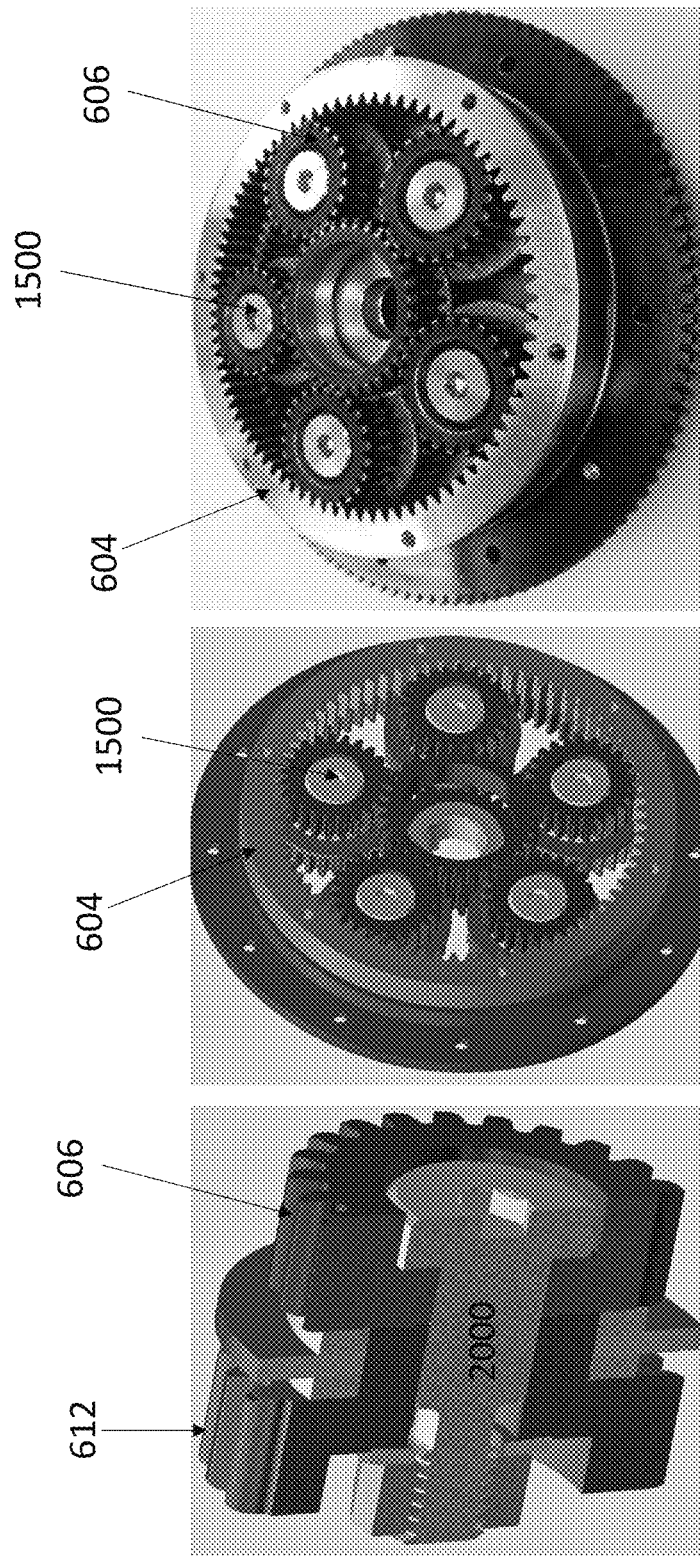

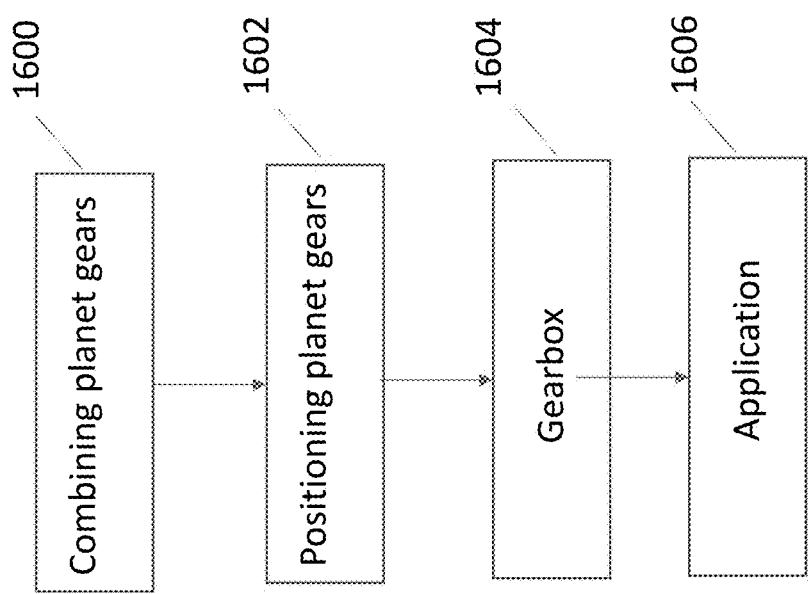

US 10,941,838 B2

BEARINGLESS PLANETARY GEARBOX

CROSS REFERENCE TO RELATED APPLICATIONS

This application claims the benefit under 35 U.S.C. Section 119(e) of and commonly-assigned U.S. Provisional Patent Application Ser. No 62/481,239, filed on Apr. 4, 2017, by Nikola Z. Georgiev and Joel W. Burdick, entitled "Bearingless Planetary Gearbox", (CIT-7751-P); which application is incorporated by reference herein.

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

The present invention relates to a planetary gearbox system.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.)

The size, weight, cost, and capabilities of a robotic system are heavily influenced by the characteristics of its actuators. Furthermore, the actuators' dynamics have a profound effect on the robot's achievable controlled performance. The torque density of electric motors is quite low; consequently, high reduction gearboxes are usually employed to achieve high output torque with electric motors. A short review of the most widely used speed reducers in robotic applications (harmonic drives, cycloidal drives and conventional planetary gearboxes) is provided below. The advantage and disadvantages of these devises are also discussed. Then a compound epicyclic gearbox referred to as the planetary Gearbox with double-row planetary pinion is discussed. The present disclosure describes a new type of planetary gearbox which is a modification of this compound design with improved performance, compactness and weight.

A. Harmonic Drives

Harmonic drives (FIG. 1) are widely used in robotic applications that require high torque density, high compactness and positioning accuracy. They have virtually no backlash and have a great advantage in environmentally challenging conditions, such as in space applications, due to the possibility of hermitic sealing [3], [11]. Even though these gearboxes have only three components (wave generator 100, flexspline 102, and circular spline 104), the drive must be manufactured with high accuracy, using complex machining processes. Thus, custom designs of such drives is difficult and expensive to implement. The efficiency is around 70% to 80%, and heating due to friction between the gear teeth usually limits the performance [11]. Furthermore, intrinsic kinematic errors [2], load hysteresis [4], dry and velocity dependent friction, nonlinear torsional compliance [5], [6], vibration and resonance losses [2], [5], [6], all lead to performance degradation. Thus, nonlinear behavior, instabilities and unexpected fatigue failure are of concern in dynamic applications with high gain feedback loops of harmonic drives. It is also difficult to accurately control the torque at the output of the drive.

B. Cycloidal Drives

Cycloidal drives, like harmonic drives, have high reduction ratios and compact size (see FIG. 2). FIG. 2 illustrates a cycloidal drive including ring gear housing (fixed) 200, high speed shaft assembly 202, eccentric cam assembly 204, cycloid discs 206, and slow speed shaft assembly 208. Cycloidal drives permit higher operational torque and efficiencies with lower noise and vibration because the torque is transmitted by roller bearing and only compressive stresses are involved [8]. However, even with precision machining tolerances, backlash and torque ripple caused by reduction ratio fluctuation are common and unavoidable [7], [8], [9]. Thus, custom design with high accuracy for high performance robotic application are both expensive and difficult to manufacture [9].

C. Conventional Planetary Gearboxes

Planetary gearboxes are attractive for their high linearity and efficiency [11]. FIG. 3 illustrates a planetary gearbox including a sun gear 300, a ring gear 302, planets 304, and an output 306. Gears are standard mechanical components, thus, custom high accuracy gearing can readily be manufactured. However, low backlash or backlash-free epicyclic gearing requires high manufacturing accuracy for all components which can be quite costly. The reduction ratio of the one-stage planetary gearbox is practically limited to 1:3-8 [11]. If higher ratios are desired, then multiple stages can be concatenated. However, the overall size and weight of the gearbox increases substantially in this case. Since the sun gear is typically a small size pinion, the maximum torque that can be generated by a planetary stage is limited by its size, as the other gear components carry much lower loads. This fact can be used to explain why high reduction, high torque, multi-stage planetary gearboxes have substantial mass and size.

D. Planetary Gearbox With Double-Row Planetary Pinion

FIG. 4 shows the schematic structure and a CAD drawing of a compound planetary gearbox comprising a planetary Gearbox with Double-row Planetary Pinion, comprising a sun gear 400, a stationary ring gear 402, planets 404, a carrier 406, and an output ring gear 408. The planets must be radially supported by bearings, usually in the carrier. This layout is very attractive as a very wide range of reduction ratios can be achieved in a single composite stage [11]: e.g., from about 1:8 to 1:500. The planets, called gear clusters or compound gears [11], consist of two rigidly connected gears. The stationary ring gear is grounded and, thus, the sun gear is the input, while the output ring gear represents the gearbox output. Detailed kinematic description of this layout and similar layouts are presented in [11] and [12].

An application of this planetary layout in the Gear Bearing Drive is described in [12], [13] and [14]. FIG. 5 shows the schematic structure of this design, comprising input 500, stage 1 planets 502, stage 2 planets 504, roller ring 506, output (stage 2 ring) 508, stage 2 ring 510, ground (stage 1 ring 512) and rigid coupling 514. In the Gear Bearing Drive concept, the planets have additional cylindrical extrusions that extend outwards from both gears and function as roller bearings. The sun gear and the ring gears have similar roller extrusions. The gears' rolling surfaces in combination with roller rings play the role of the carrier. The secondary function of the gears as bearing raises concerns regarding the gearbox performance related to load distribution, backlash and reliability. Furthermore, the high manufacturing complexity results in a significantly higher cost.

SUMMARY OF THE INVENTION

To overcome the limitations in the prior art described above, the present disclosure describes a new type of planetary gearbox comprising two planetary stages that share the compound planets. The bearingless planetary gearbox includes a first sun gear; a first ring gear concentric with the first sun gear; a first set of planet gears meshing with an outside of the first sun gear and with an inside of the first ring gear, wherein the first set comprises gears indexed with an integer i ($1 \leq i \leq n$); a second sun gear; a second ring gear concentric with the second sun gear; and a second plurality of planet gears meshing with an inside of the second ring gear and an outside of the second sun gear, wherein the second set comprises n gears indexed with the integer i. For each of the i, the $i^{th}$ gear in the first set of planet gears is fixed to the $i^{th}$ gear in the second set of planet gears so that the $i^{th}$ gear in the first set and the $i^{th}$ gear in the second set rotate together coaxially. Thus, the $i^{th}$ gear in the first set of planet gears and the $i^{th}$ gear in the second set of planet gears can form an $i^{th}$ compound gear planets (alternatively referred to as a gear cluster) wherein $1 \leq i \leq n$.

In one or more examples, the $i^{th}$ compound planet, comprised by the $i^{th}$ gear in the first set and $i^{th}$ gear in the second set is a solid compound gear. In one or more examples, the n solid compound gears are identical, the $i^{th}$ gear in the first set of planet gears is aligned to the $i^{th}$ gear in the second set of planet gears, and $1 \leq i \leq n$.

The $i^{th}$ compound planet, comprised by the $i^{th}$ gear in the first set and $i^{th}$ gear in the second can be connected by a flexible or a rigid coupling. In one or more examples, the $i^{th}$ compound planet is formed by connecting the $i^{th}$ gear in the first set and $i^{th}$ gear in the second set with a shaft fixture. In this case the $i^{th}$ gear in the first set and $i^{th}$ gear in the second set are axially mated to each other through a frictional coupling.

In one or more examples, the n gears in the first set are the same and each have a first diameter, and the n gears in the second set are the same and each have a second diameter larger or smaller than the first diameter.

The bearingless planetary gearbox is unique in its floating structure. All gear components can float unconstrained except for one of the ring gears which is immobilized or stationary. The other ring gear is the gearbox output. The first sun gear is the driving sun gear, which is the gearbox input, and the second sun gear is used to only provide planet support. A key innovation is the introduction of the second sun gear which allows elimination of the planet carrier that supports the gear planets in conventional planetary gearbox designs. The elimination of the planet carrier reduces mass and cost, and eliminates the planet bearings.

In one or more examples, an actuator comprising the planetary gearbox includes a motor including a motor rotor and a motor stator; the motor rotor coupled to the first sun gear; and the motor stator electromagnetically coupled to the motor rotor. The motor may, for example, comprise an outrunner motor, wherein the motor rotor is an outer rotor on an outside of the motor stator, and the outer rotor is attached to the first sun gear so as to directly drive the first sun gear. In various examples, the first sun gear comprises an annulus forming a ring around an outer surface of the outer rotor.

In one or more actuator embodiments, the first ring gear is immobilized, the first sun gear transfers first torque from the motor to the first set of planet gears, the first set of planet gears transfer second torque comprising at least a portion of the first torque to the second set of the planet gears, and the second set of the planet gears transfer at least a portion of the second torque to the second ring gear. For example, a casing may be coupled to the first ring gear so as to immobilize the first ring gear; and an output shaft connected to the second ring gear. The actuator may further comprise a bearing support assembly for the output shaft; a bearing support assembly for the motor rotor; and the motor stator coupled to the casing so as to immobilize the motor stator.

In one or more further actuator embodiments, the motor is connected to the first sun gear so as to drive the first sun gear and the second ring gear is immobilized. In this case, the first sun gear transfers torque from the motor to the first set of planet gears, and the first set of the planet gears transfer at least a portion of the torque to the first ring gear.

In one example, a casing is coupled to the second ring gear so as to immobilize the second ring gear; and an output shaft connected to the first ring gear. In one or more further examples, the actuator may also further include a bearing support assembly for the output shaft, a bearing support assembly for the motor rotor, and the motor stator coupled to the casing so as to immobilize the motor stator.

Combining the bearingless planetary gearbox with a brushless DC motor results in a compact, lightweight, high precision actuator due to the low backlash and efficient structure of the bearingless planetary gearbox. In one or more examples, the motor stator that contains the coils is grounded to the immobilized ring gear and the motor rotor comprised of the permanent magnets is coupled to the driving sun gear.

In one or more examples, the gearbox is designed for a robotic application wherein the gearbox is built into a robotic joint. The bearingless planetary gearbox features an efficient two stage structure that can achieve a very wide range of reduction ratios (e.g., from approximately 1:8 to 1:500). Embodiments eliminating the planetary gearbox bearings allow the construction of a simplified and improved robotic joint assembly that does not feature any bearings except for the possible joint support bearings. Devices utilizing the bearingless planetary gearbox can achieve high power density due to the low component count and high compactness of the gearbox design. This makes the bearingless planetary gearbox attractive for applications related to mobile and limbed robotic devices, robotic arms and prosthetics. A further advantage of the gearbox design described herein is its high manufacturability as all gearing components can each be manufactured with high accuracy with standard machining techniques. The described properties of the bearingless planetary gearbox make the gearbox attractive for a great variety of applications ranging from aerospace, manufacturing, automation, transportation, vehicle propulsion and others.

BRIEF DESCRIPTION OF THE DRAWINGS

Referring now to the drawings in which like reference numbers represent corresponding parts throughout:

FIG. 6A-6B are illustrations of the Bearingless Planetary Gear Drive kinematic layout, according to one or more embodiments of the present invention.

FIG. 8A is a CAD drawing showing the planet alignment according to one or more embodiments of the bearingless planetary gear drive.

FIG. 8B illustrates an assembly alignment part for the example shown in FIG. 8A.

FIG. 9A illustrates a planet compound gear planets including alignment holes that can be used in the bearingless planetary gear drive of FIG. 6B.

FIG. 9B is a CAD drawing of the compound gear planet in FIG. 9A.

FIGS. 10A and 10B illustrate electric motor architecture that can be used with the bearingless planetary gearbox in one or more embodiments, wherein FIG. 10A illustrates an outrunner motor and FIG. 10B illustrates a motor embodiment with an inner rotor.

FIGS. 13A-13D illustrate a robotic joint including a gearbox according to one or more embodiments, wherein FIG. 13A is a schematic of the joint, FIG. 13B is a view showing the motor assembled in the gearbox but without the joint rotor, FIG. 13C view showing the motor prior to assembly, and FIG. 13D shows the assembled joint.

FIGS. 14A-14E illustrate a series elastic actuator (SEA) including a bearingless planetary gearbox according to one or more embodiments, wherein FIG. 14A is a schematic cross-section, FIG. 14B is a view without the stator, FIG. 14C is a view with the stator, FIG. 14D is a view showing the rotor, stator, and planet gears, and FIG. 14E is a view without the stator showing the permanent magnets in the rotor.

FIGS. 15A-15F illustrate a gearbox according to embodiments of the present invention constructed using off the shelf gearing components, wherein FIG. 15A is a schematic close up of the planet gears attached using a screw, FIG. 15B is a schematic showing the planet gears attached with a screw and meshing with the ring gear and sun gear, and FIG. 15C is a view of a working embodiment.

FIG. 15D illustrates a similar series elastic actuator as shown in FIGS. 14A-14E, comprising the bearingless planetary gearbox of FIGS. 15A-15C.

FIGS. 15E and 15F illustrate the coupling between the driving sun gear and the motor, for the coupling at different positions.

FIG. 16 is a flowchart illustrating a method of making a gearbox according to one or more embodiments.

DETAILED DESCRIPTION OF THE INVENTION

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Technical Description

First Embodiment: The Bearingless Planetary Gearbox

Figure 4A:
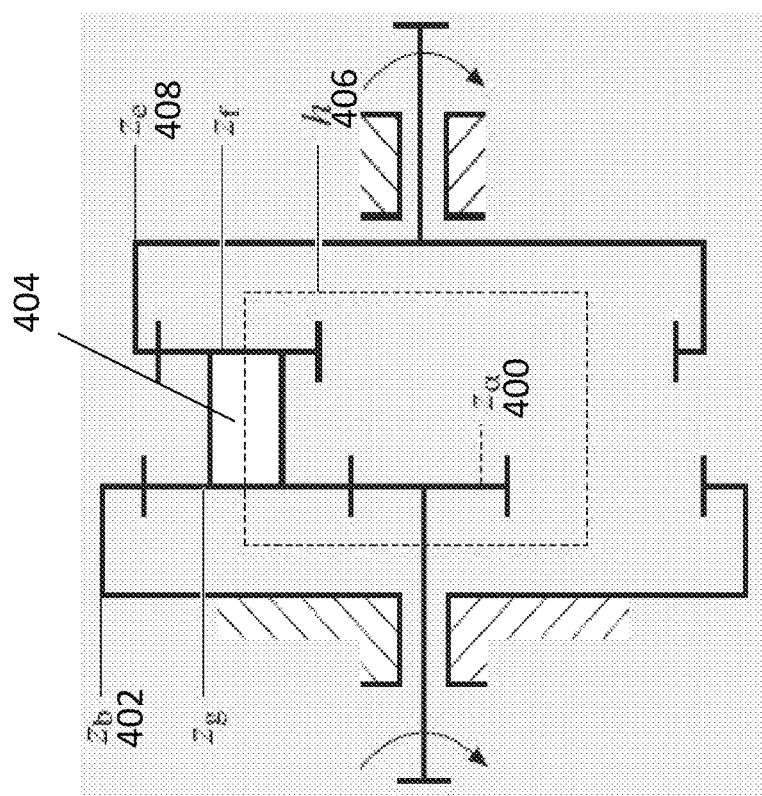
FIG. 4A is a schematic illustration of a conventional double planetary row gearbox layout [11] and FIG. 4B is a computer aided design (CAD) drawing of the double planetary row gearbox layout of FIG. 4A.
Figure 4B:
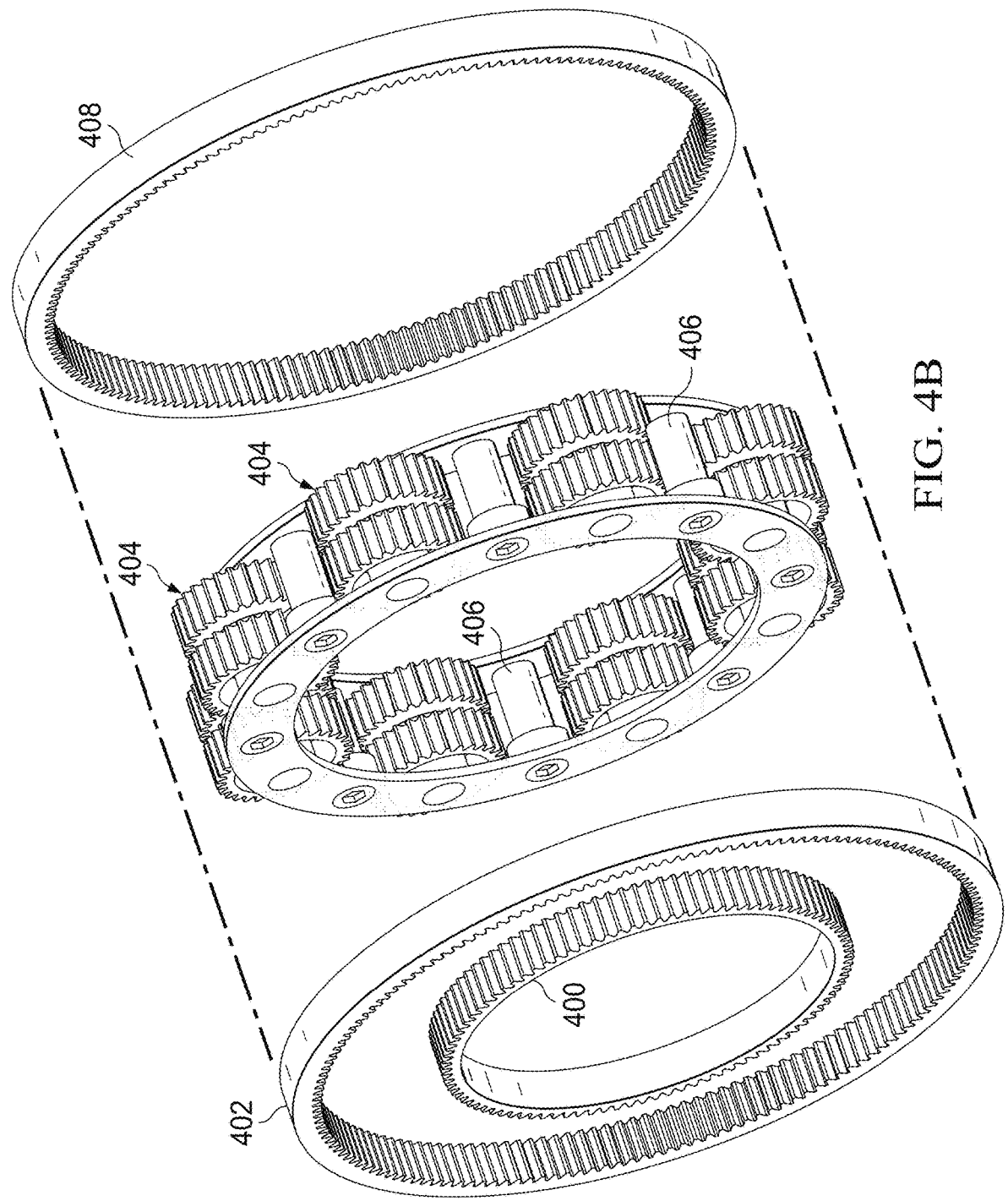
Figure 5:
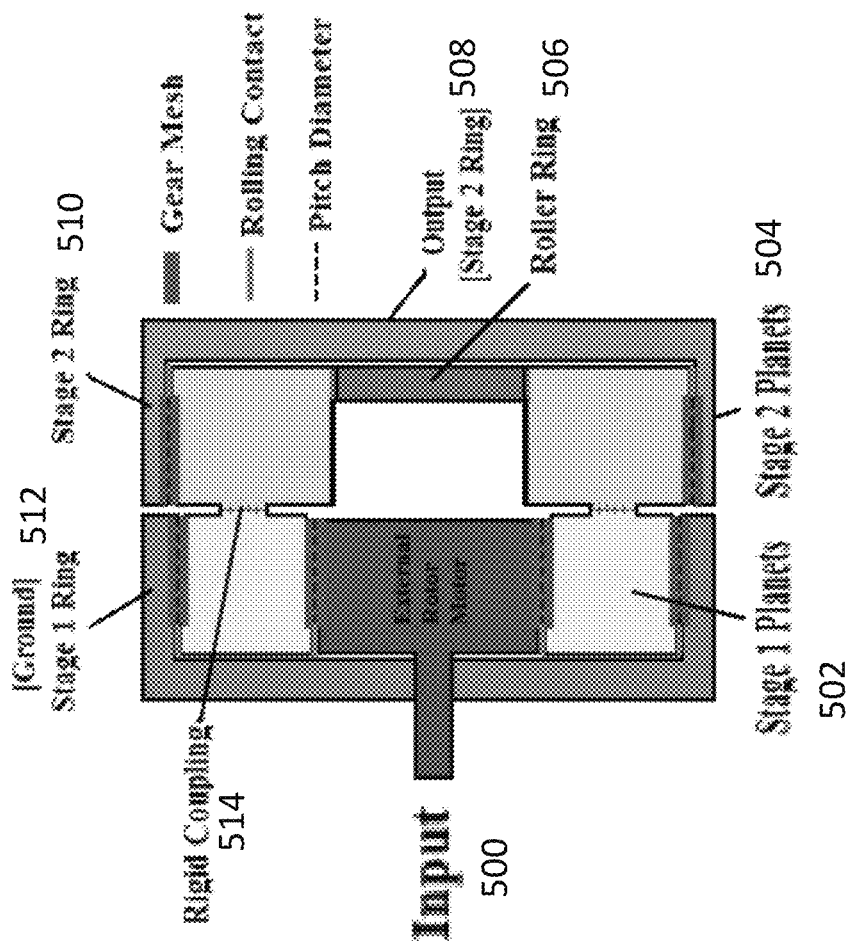
FIG. 5 is an illustration of a conventional gear Bearing Drive [12].

The bearingless planetary gearbox is a modification of the gearbox kinematic layout of FIGS. 4A and 4B which can, in one or more examples, result in significantly improved gearbox performance due to the lower mass and floating nature.

Figure 1:
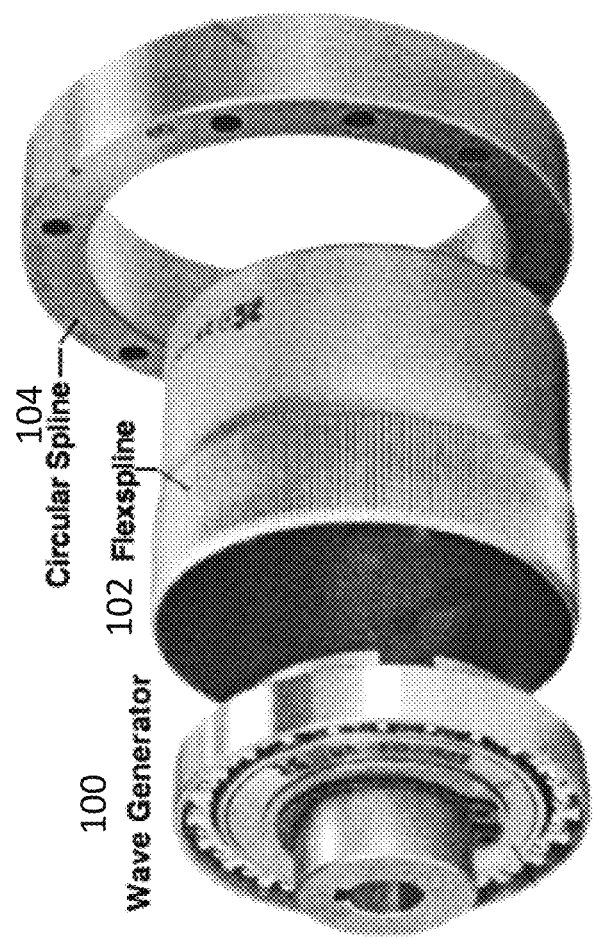
FIG. 1 is an illustration of a conventional harmonic drive [2].
Figure 2:
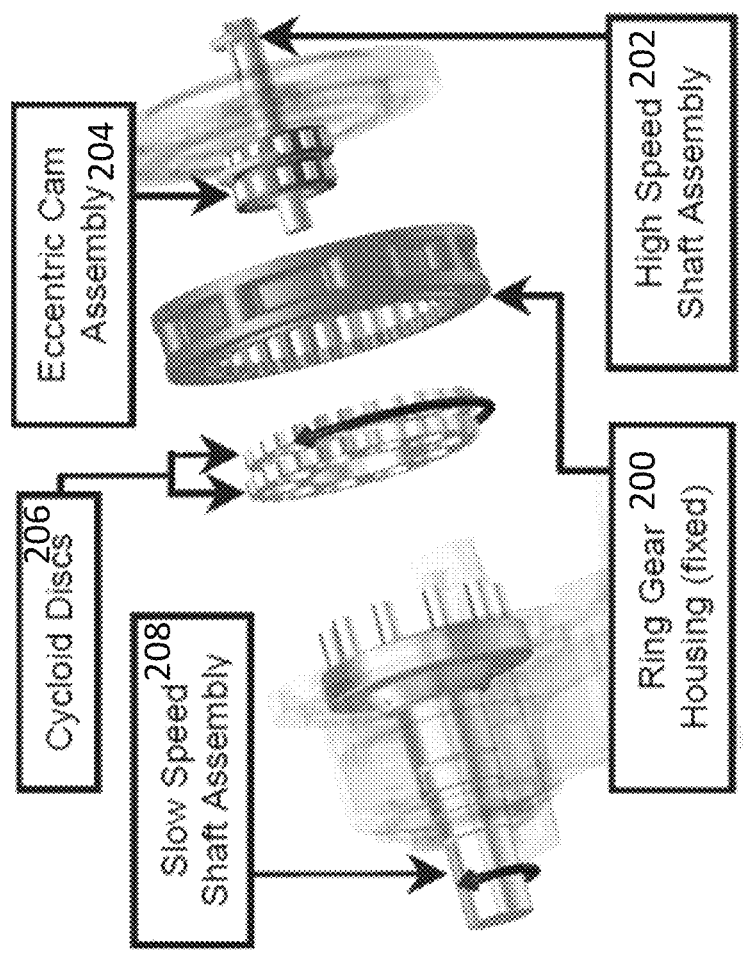
FIG. 2 is an illustration of a conventional cycloidal drive [9].
Figure 3:
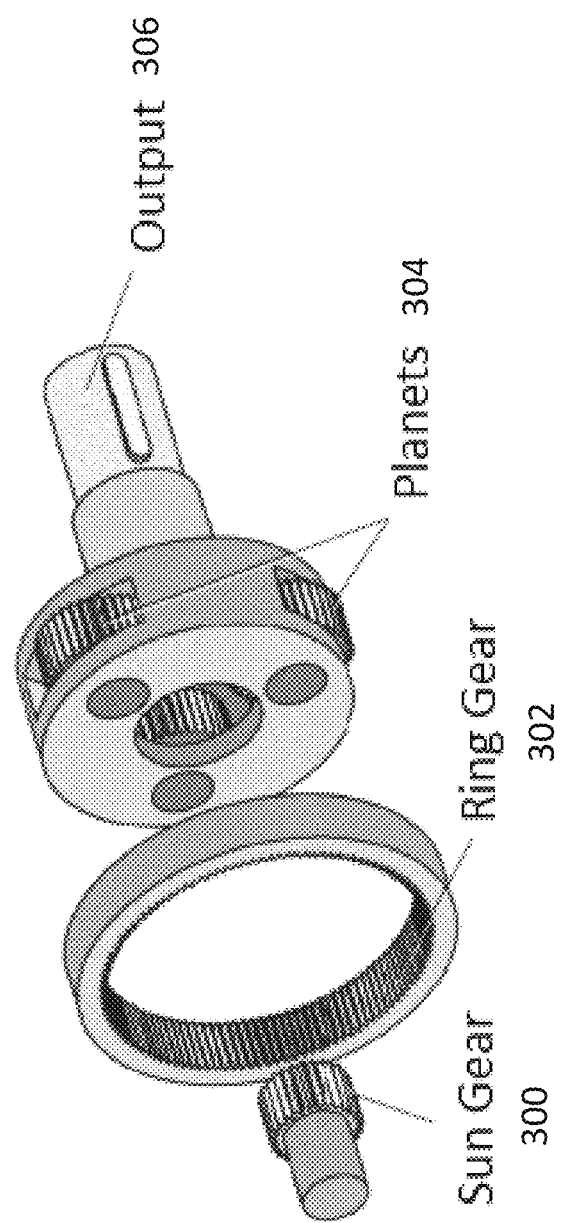
FIG. 3 is an illustration of a conventional one-stage planetary gear-box.

In the conventional one stage planetary gearbox of FIG. 3, the carrier is the output link and is of critical importance. However, the carrier in the gearbox of FIGS. 4A-4B only provides radial support for the planets and does not transmit any load. The unbalanced radial loads are due to the meshing of the planet gears and output ring. The carrier assembly involves many components which add substantial mass and some of which can require complex machining and tight tolerances [11].

Figure 6A:
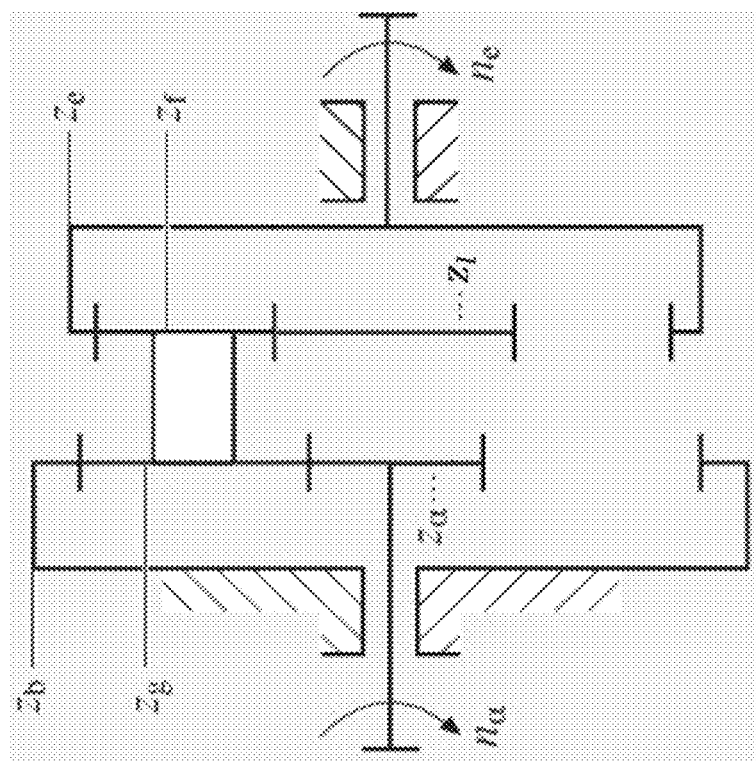

FIGS. 6A and 6B show a kinematic layout and a schematic Computer Aided Design (CAD) drawing of a bearingless planetary gearbox embodiment, respectively, wherein the carrier is eliminated and a second sun gear 608 is introduced to provide the necessary support of the compound gear planets 614 comprising a first set of planet gears 606 and a second set of planet gears 612. FIG. 6B illustrates the planetary gearbox 600 comprises a first sun gear 602 having a number of teeth $z_a$; a first ring gear 604 concentric or coaxial with the first sun gear 602, the first ring gear 604 having a number of teeth $z_b$; and a first set of planet gears 606 having teeth meshing/in mesh with the teeth on an outside of the first sun gear 602 and with the teeth on an inside of the first ring gear 604. The first set of planet gears 606 further comprises n gears each indexed with an integer i ($1 \leq i \leq n$) and each having a number of teeth $z_g$. The gearbox 600 further comprises a second sun gear 608 coaxial with the first sun gear 602 (the second sun gear having a number of teeth $z_j$); a second (or output) ring gear 610 having a number of teeth $z_e$ and coaxial or concentric with the second sun gear 608, the first sun gear 602 and the first ring gear 604; and a second set of planet gears 612 having teeth meshing with/in mesh with the teeth on an inside of the second ring gear 610 and the teeth on an outside of the second sun gear 608. The second set of planet gears 612 each have a number of teeth $z_f$ and also comprise n gears indexed with the integer i ($1 \leq i \leq n$), where n is the same as for the first set of planet gears 606.

For each of the i, the $i^{th}$ gear in the first set of planet gears 606 is fixed to the $it^h$ gear in the second set of planet gears 612 so that the $i^{th}$ gear in the first set of planet gears 606 and the $i^{th}$ gear in the second set of planet gears 612 rotate together coaxially and form the compound gear planet 614. In FIGS. 6A-6B, the planet 614 is solid, e.g., a compound gear planet manufactured from a solid blank. However, assembled compound planets are also possible, as discussed in Embodiment IV below.

The second sun gear can always be introduced if the planet gears are identical and all gearing components have the same module. Eliminating the carrier and introducing the second sun gear $z_l$ has the following consequences:

(1) The planets float freely: they are not constrained in the radial direction except by their meshing with the sun and ring gears. Thus, the load distribution between the planets is improved. The gearbox load rating could be increased by adding more planets.

(2) The manufacturing complexity of the planets is reduced as no bearing are required. Therefore, gear cutting and possibly finishing are the only critical steps. I.e., the additional tolerance requirements for mating and alignment of the bearings are eliminated.

(3) The mass is significantly reduced as all gear components can be constructed with thin sections (see FIG. 6B).

(4) The gearbox can be designed with reduced backlash. No shift corrections are required for assembly as planets are not assembled in the carrier.

(5) The assembly procedure is significantly improved. The planets can be inserted one by one instead of assembled simultaneously as part of the carrier.

(6) The sun gear $z_l$ can axially constrains the planets.

A single planetary stage can have efficiency in the range of 0.96-0.98 [11]. Thus, depending on the manufacturing and gearbox design characteristics, a bearingless planetary gearbox embodiment comprising two planetary stages that share the same gear cluster planets could achieve a high efficiency 0.9.

The bearingless planetary gearbox requires the following conditions to be met so that n symmetrically positioned compound gear planets 614 can be assembled around the sun gears 602 and 608:

$$z_a + z_b \text{ is divisible by } n$$

$$\frac{z_a z_a - z_b z_a}{g} \text{ is divisible by } n$$

where g is the greatest common divider of $z_e z_g - z_b z_f$ and $z_g$. If this requirement is met, then n planets can be symmetrically positioned around the sun gear $z_a$. Alternatively, the numbers $$\frac{z_a z_a - z_b z_a}{g}$$

and $z_a+z_b$ can be used to find the planet positions for unsymmetrical planet configuration if necessary. The factorization of $z_a+z_b$ describes the possible planet positions so that the sun gear can be meshed with the planet gears and the factorization of $$\frac{z_a z_a - z_b z_a}{g}$$

describes the possible planet positions so that the output ring gear $z_e$ can be meshed with the planet gears $z_f$. Thus, a wide variety of designs are possible with unsymmetrical planet configuration. This characterizes the significantly improved bearingless planetary gearbox design versatility.

Figure 7A:
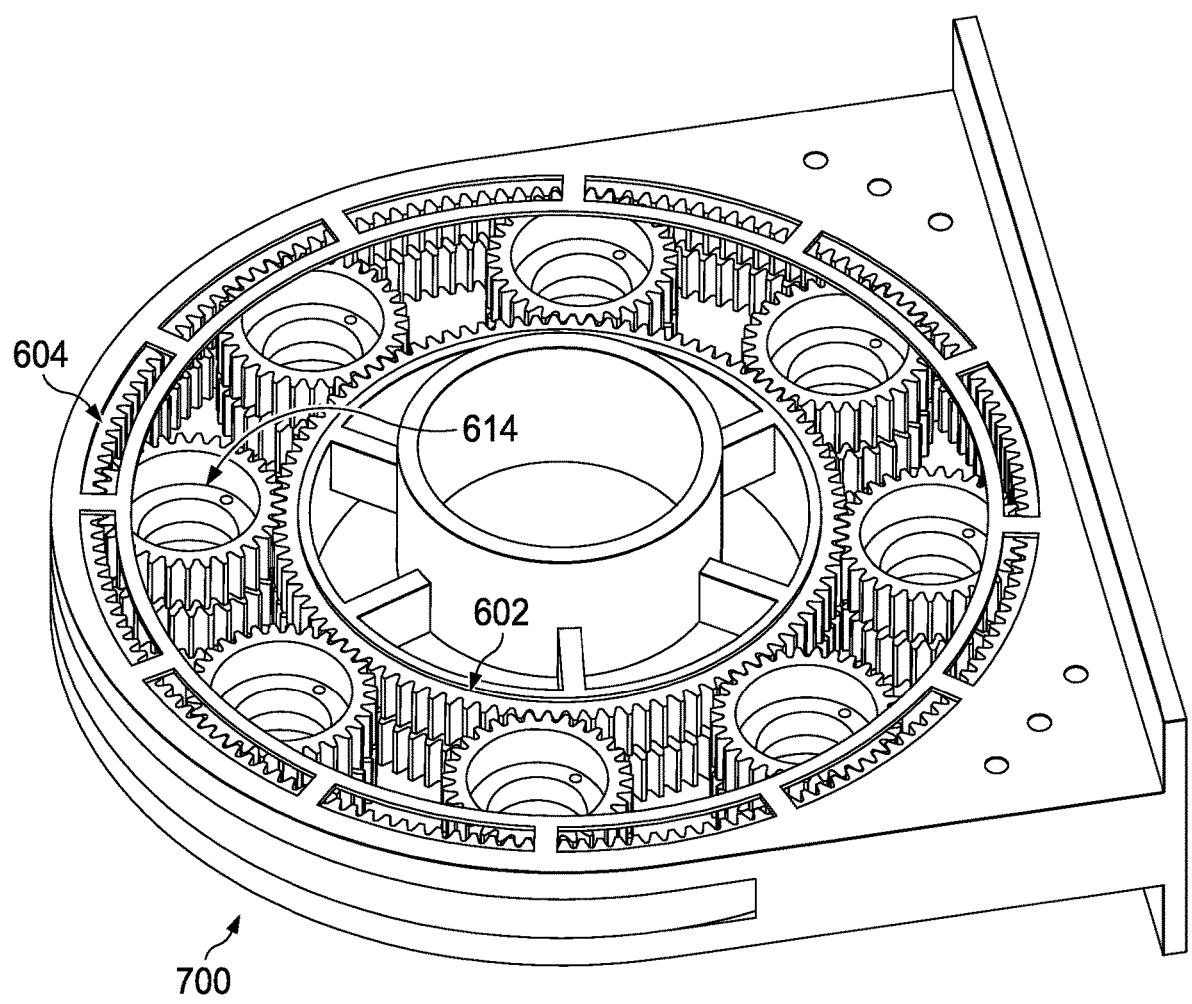
FIG. 7A illustrates a working embodiment of the bearingless planetary gear drive illustrated in FIG. 6B, showing a 3D printed case that axially constraints the motion of the gears. The gearbox diameter and width are 170 mm and 23.2 mm, while the driving sun gear diameter is 90 mm. The weight is 1.1 Kg.
Figure 7B:
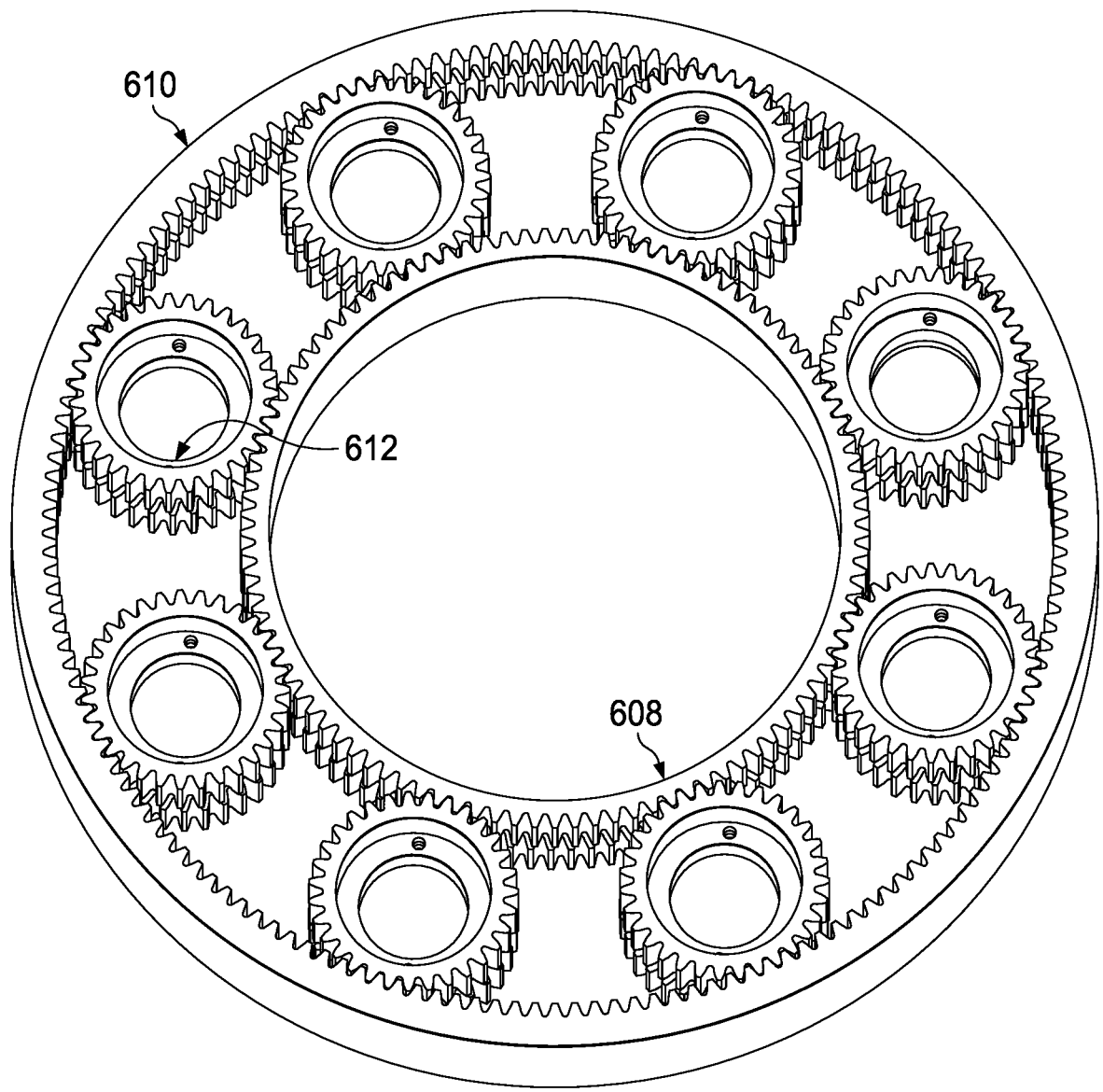
FIG. 7B view showing the floating nature of all components.

FIGS. 7A-7B show a bearingless planetary gearbox example wherein the gears are made of 4140 steel and have module M1. The gearbox has eight planets and a reduction ratio of 1:101. An approximate calculation of the maximum continuous torque deliverable from the bearingless planetary gearbox example shown in FIGS. 7A-7B, assuming the load is distributed evenly between all the planet gears and face hardened 4340 steel is used ($\sigma_{[H]}$=1160 Megapascals (MPa) and $\sigma_{[F]}$=705 M Pa approximately), results in maximum predicted torque of 1280 Nm (calculated from the Hertz stress) and 1112 Nm (calculated from the bending stress). These are continuous torque ratings without a safety factor or consideration of the working conditions such as maximum speed, lubrication, load distribution, etc. The peak torque ratings would be much higher in general.

FIG. 8A is a CAD drawing of the example gearbox 700 shown in FIGS. 7A-7B. Eliminating the carrier does not remove the need for planet alignment during assembly. In one or more examples, alignment holes 900 in the compound planet 614 can be utilized. FIG. 8B shows an alignment part 800 is used to place the planets in the right position during assembly so that all the compound gear planets in FIG. 8A have the same orientation.

The manufacturing of the ring gears and the sun gears can involve standard techniques. The main difficulties are related to the solid compound planet manufacturing. FIGS. 9A-9B show the compound gear planet design 614. The planets can be manufactured through gear shaping, however the assembly alignment holes 900 are needed both for assembly and manufacturing.

Figure 11:
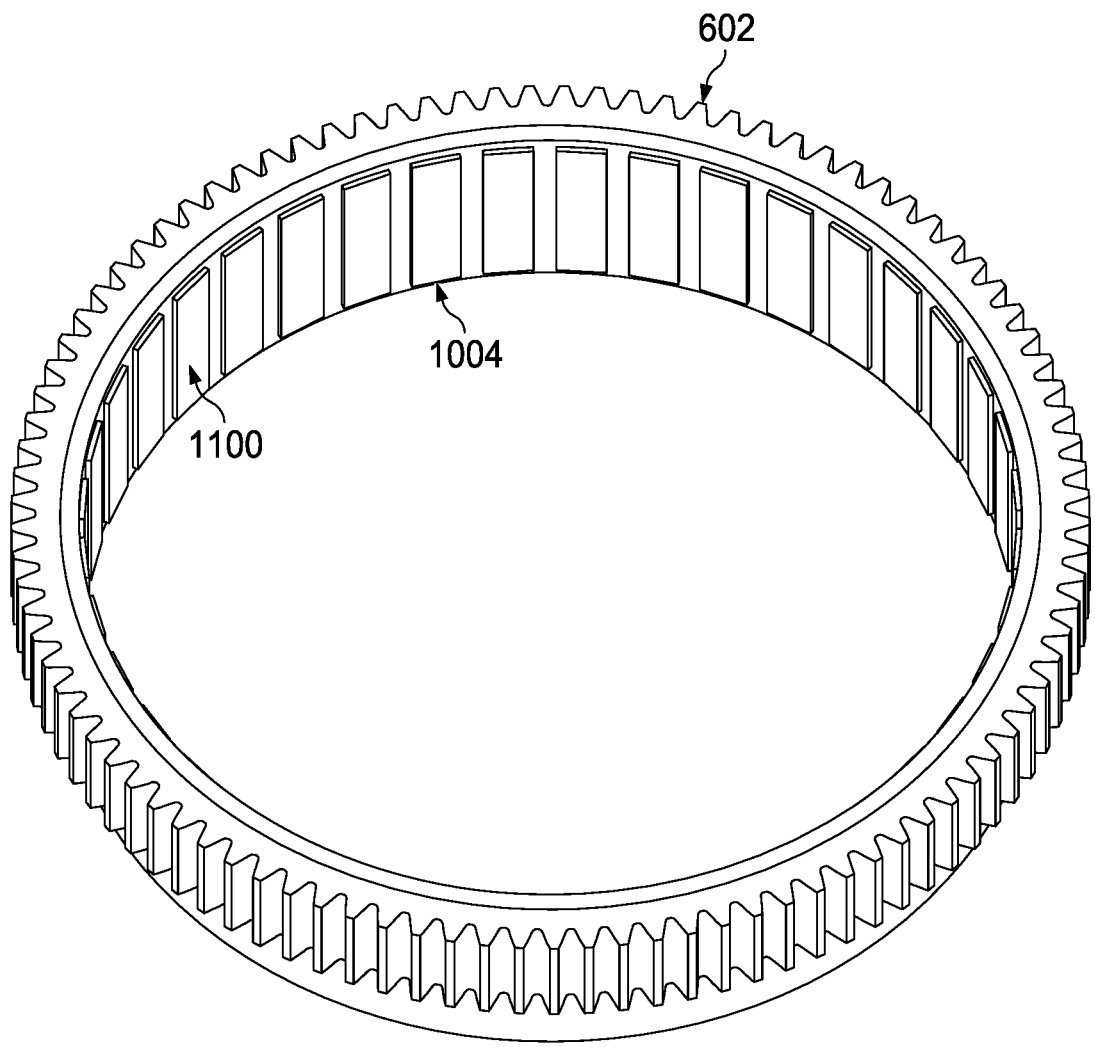
FIG. 11 illustrates the rotor of an outrunner motor combined with a sun gear of the bearingless planetary gear drive of FIG. 7A.
Figure 12:
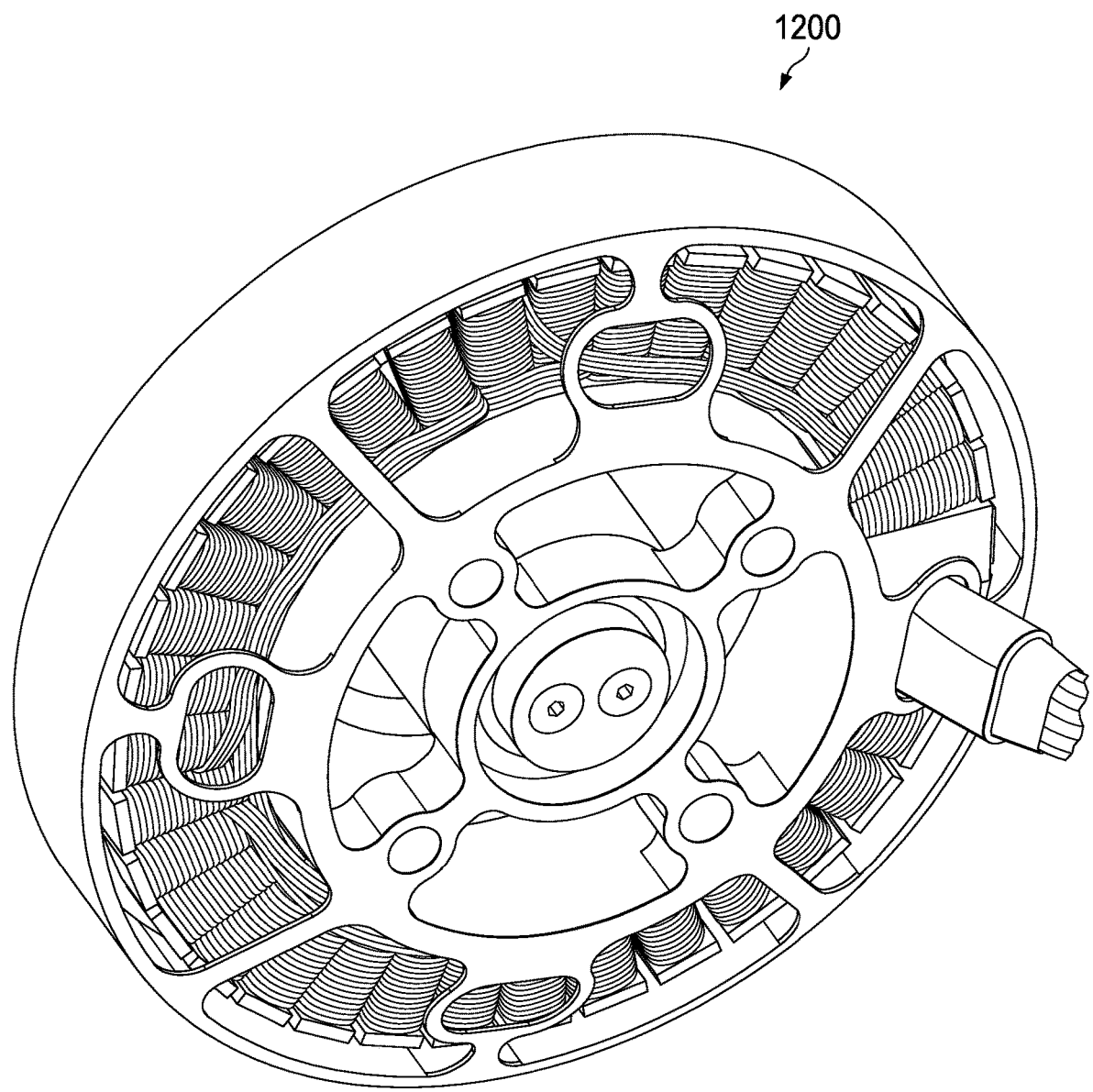
FIG. 12 illustrates a HL Q9 8308 Outrunner Motor that can be used with the bearingless planetary gearbox in one or more embodiments.

FIGS. 6A-6B illustrate an embodiment wherein the sun gear diameter can be quite large so that powerful motors can be integrated in the gearbox. The bearingless planetary gearbox 600 can be used with both inner rotor motor 1000 and outer rotor (outrunner) motor 1002. FIGS. 10A-10B show the schematic structure of the two motor types. The rotor 1004 of an outrunner motor can be rigidly attached to the sun gear 602 in FIGS. 6A-6B and 7 so as to drive the sun gear 602 directly as shown in FIG. 11. The permanent magnets 1100 in the rotor 1004 are clearly shown in FIG. 11. In such an example, there is no need for a coupling between the motor 1002 and the gearbox (sun gear 602), thereby reducing mass and complexity of the gearmotor assembly. In general the gearbox layout of FIGS. 6A-6B is perfectly suited for connection to an outrunner motor 1002. The motor shown in FIG. 12 weighs 286 g and has an approximately 2.35 Nm continuous torque rating and can drive the gearbox 700 of FIG. 7 directly.

II. Second Embodiment: Robotic Joint

Embodiments of the gearboxes illustrated herein are compact and can readily be integrated into robot joints. In various examples, the resulting actuator comprising the gearbox can have low mass, compact size and high torque. With considerably simpler manufacturing, exemplary gearboxes described herein may realize surprisingly high performance at reasonable cost.

Figure 13A:
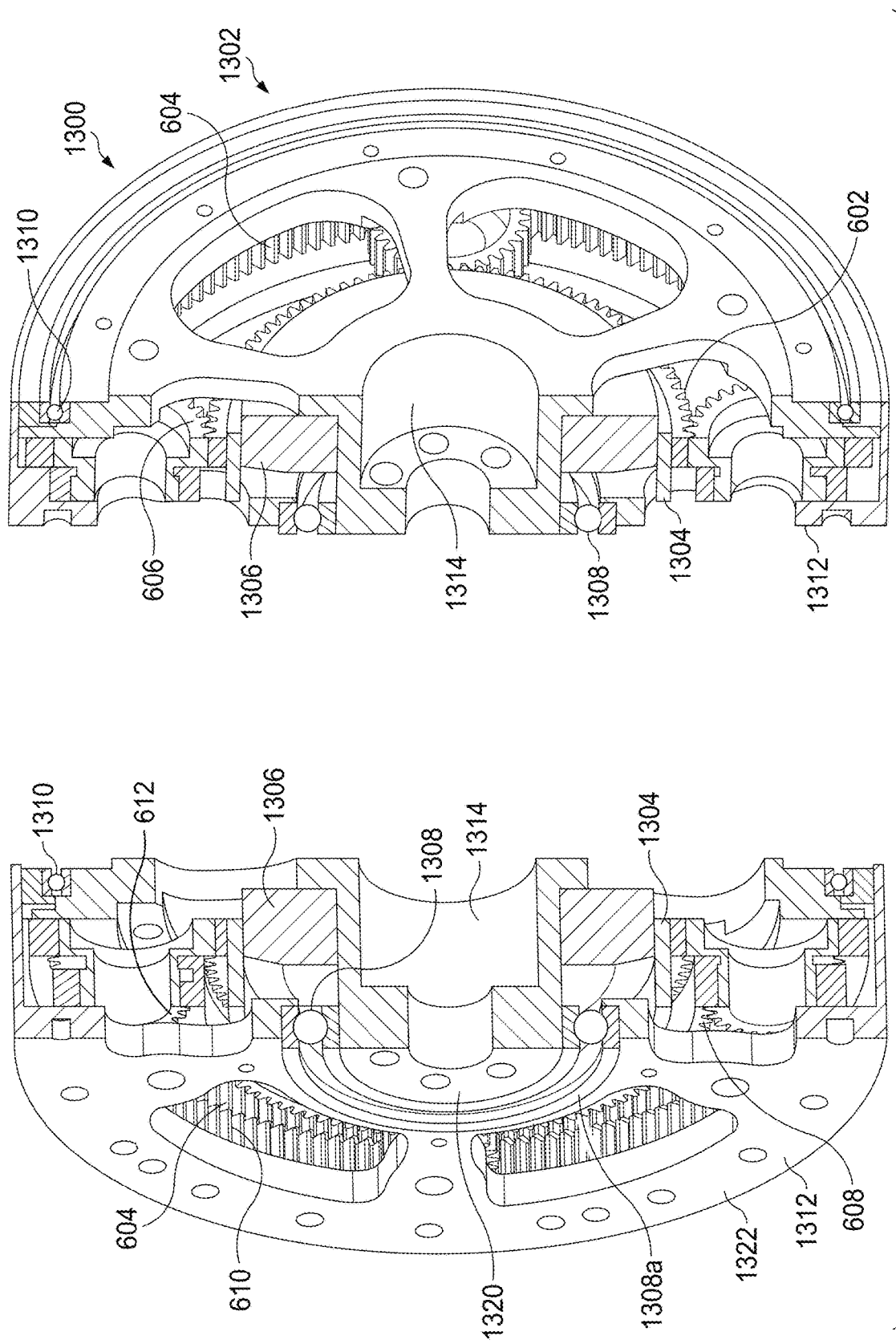
Figure 13B:
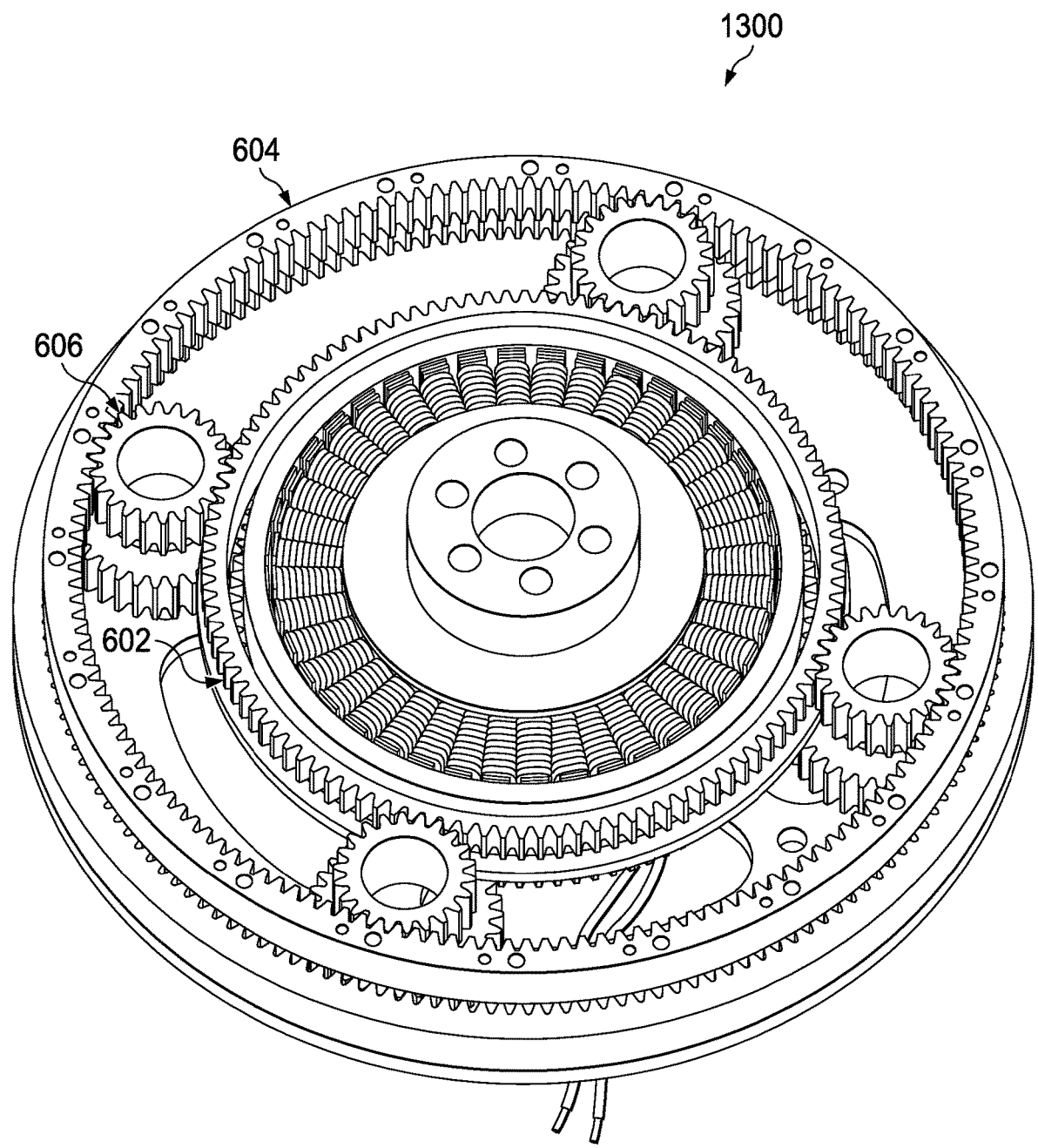
Figure 13C:
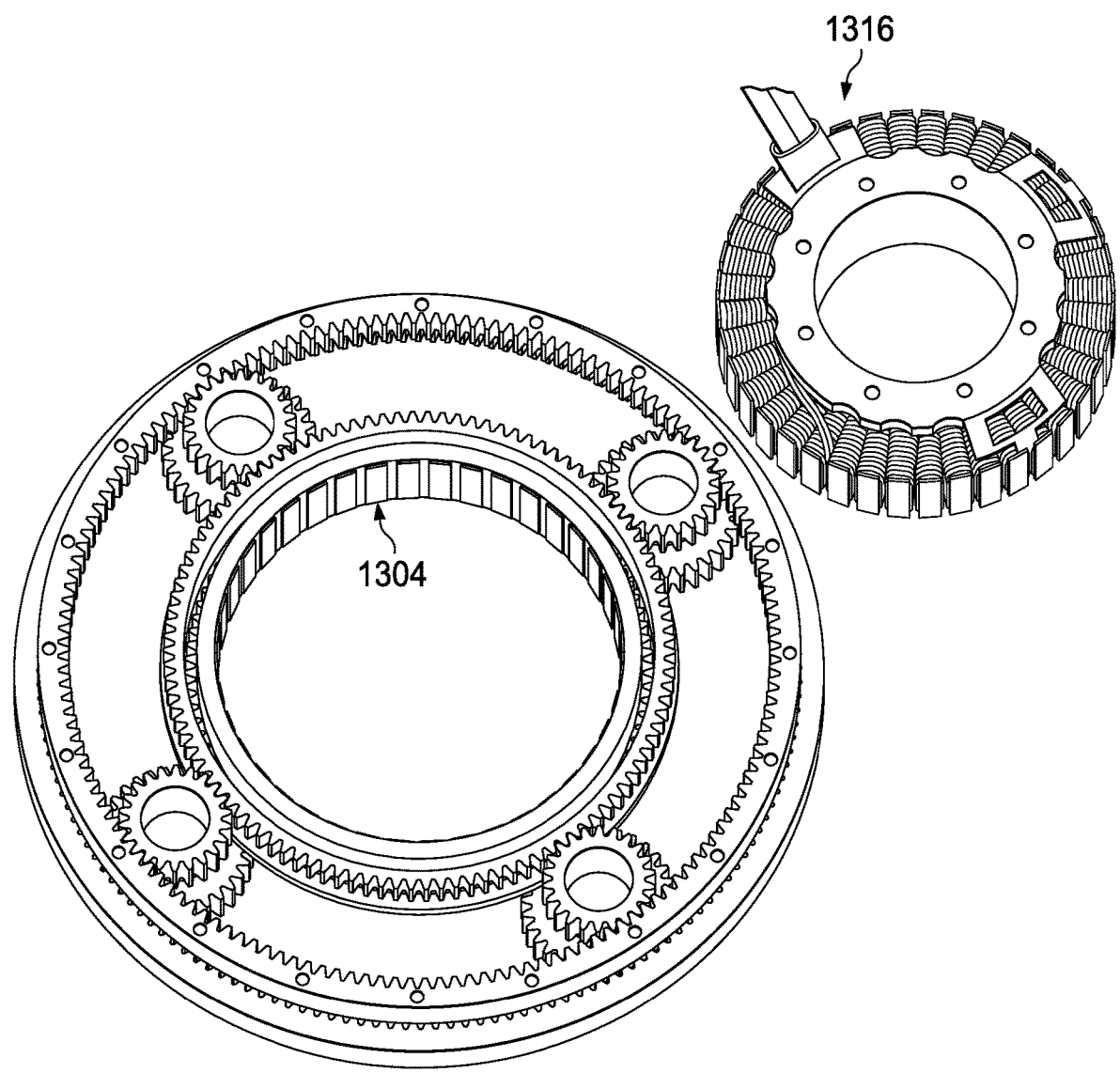
Figure 13D:
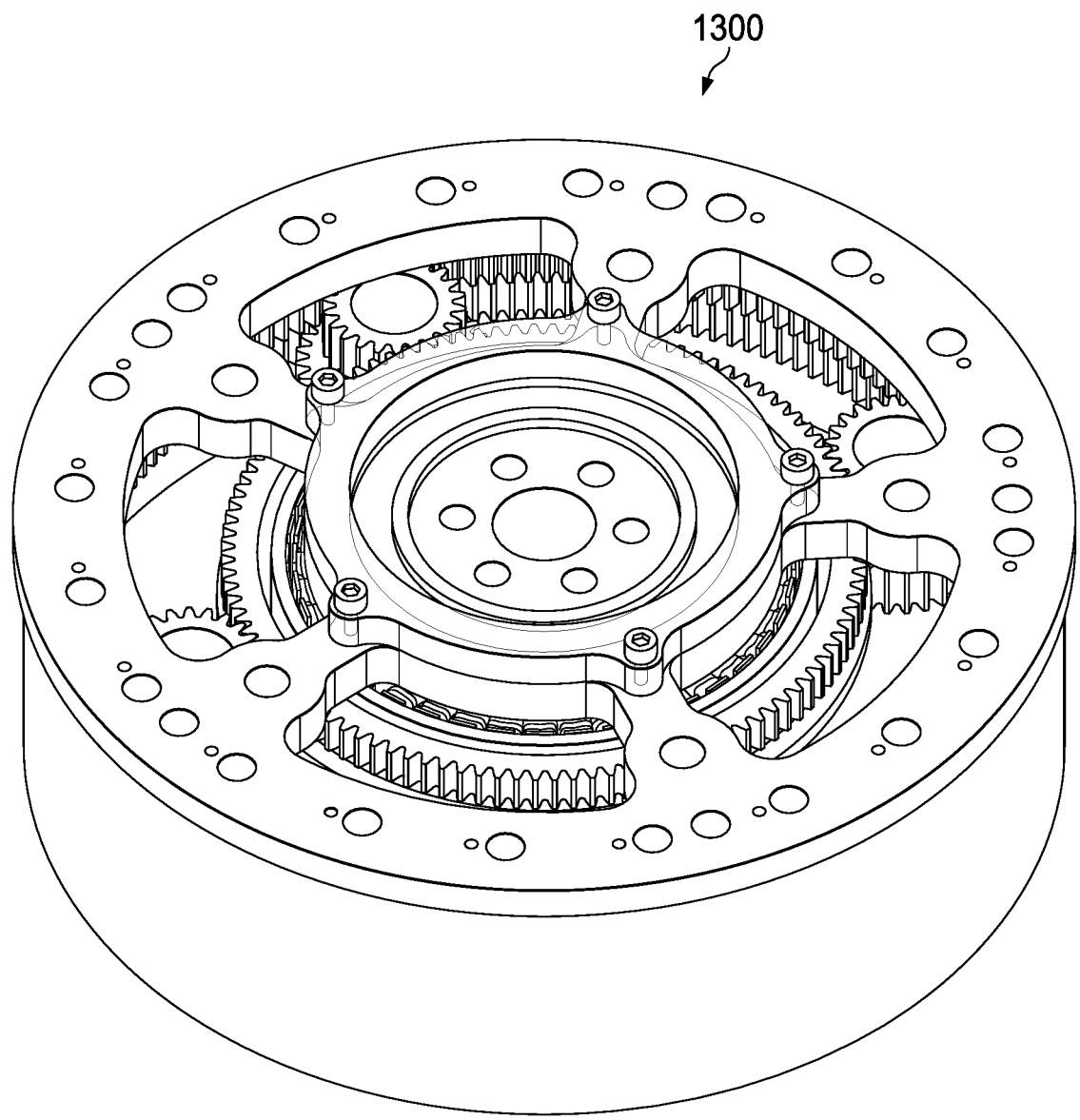

FIGS. 13A-13D illustrate a low reduction (1:10), high torque, backdrivable gearbox robotic joint 1300 comprising a gearbox 1302. The gearbox 1302 includes a high power brushless dc motor 1316 comprising a rotor 1304 and stator 1306 integrated inside the gearbox 1302 and the rotor 1304 fixed to the first sun gear 602. All gearing components float and the joint support is provided by two bearings 1308,

1310. Drive circuitry energizes the motor stator 1306 so as to rotate the motor rotor 1304. In response to the motor rotor 1304 driving the first sun gear 602, the second ring gear 610 attached to the joint output rotor 1312 rotates the joint output rotor 1312. Also shown in FIG. 13A is a joint stator 1314. FIGS. 13B-13D illustrate successfully implemented working embodiment of the joint 1300.

Figure 14A:
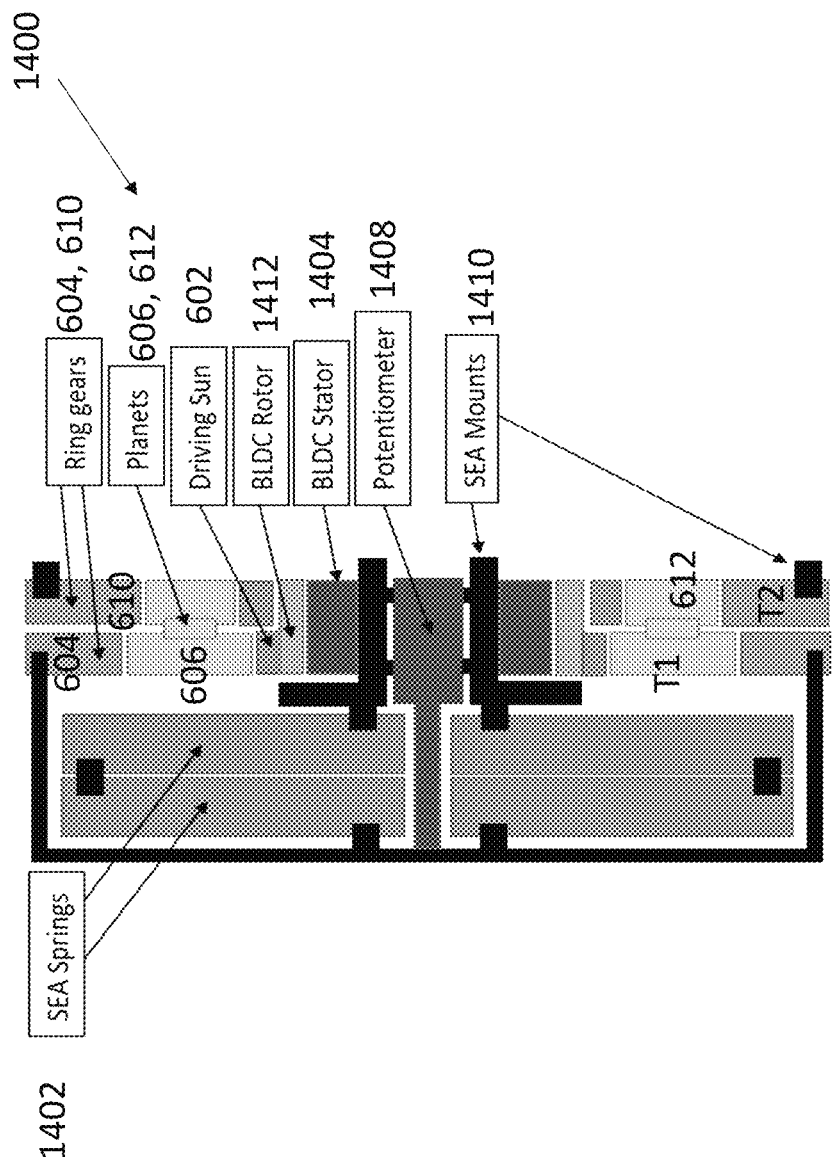
Figure 14B:
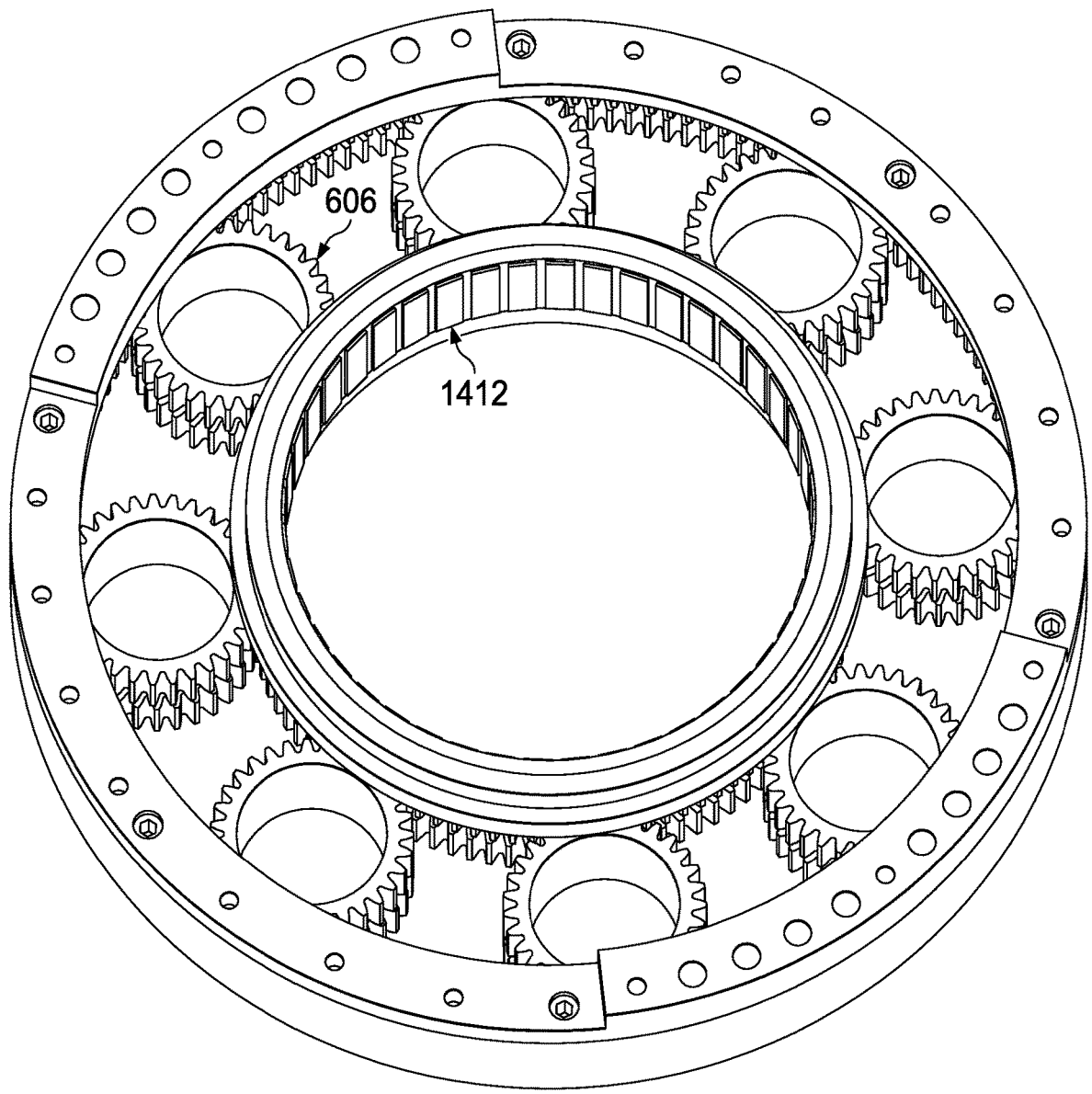
Figure 14C:
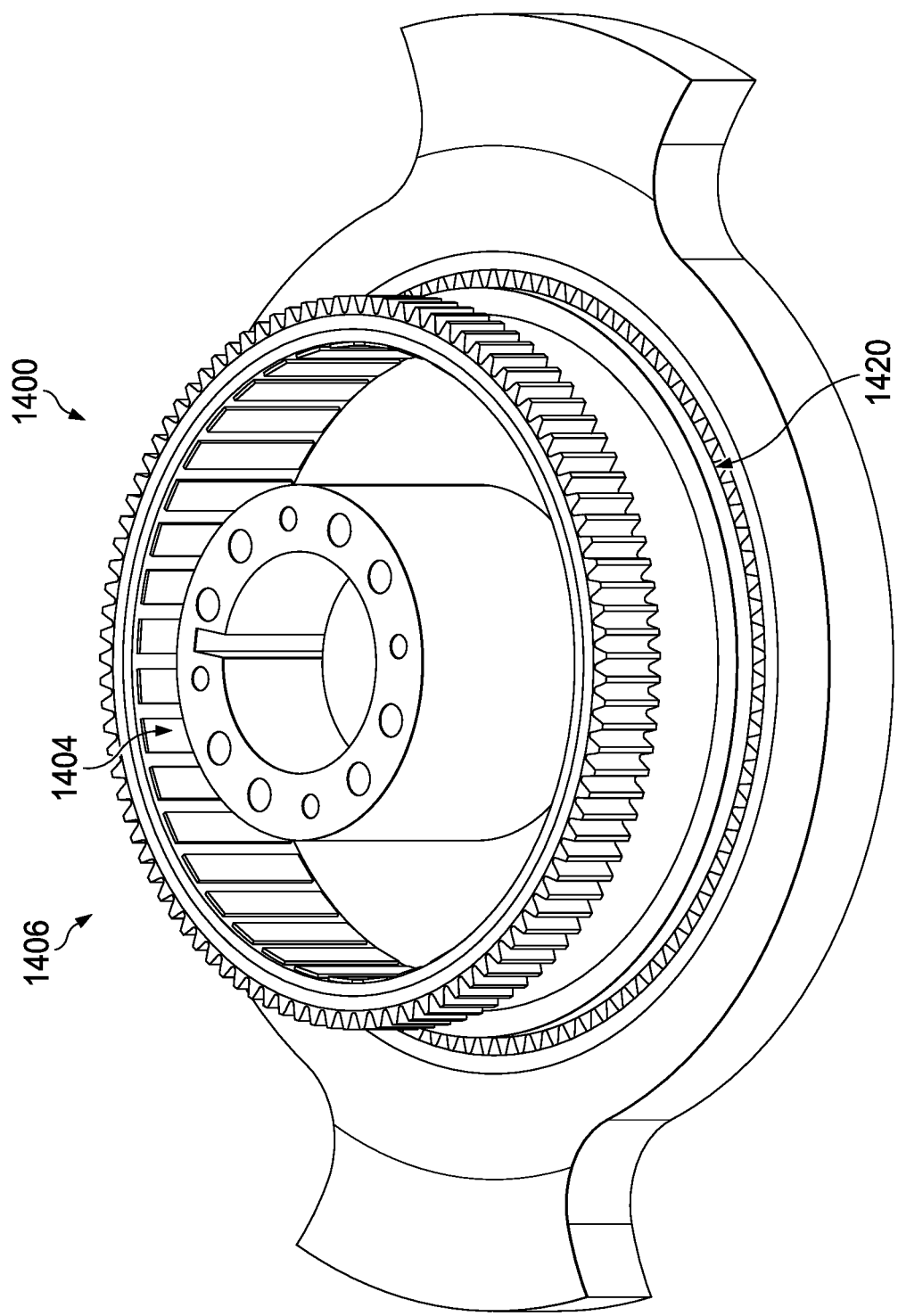
Figure 14D:
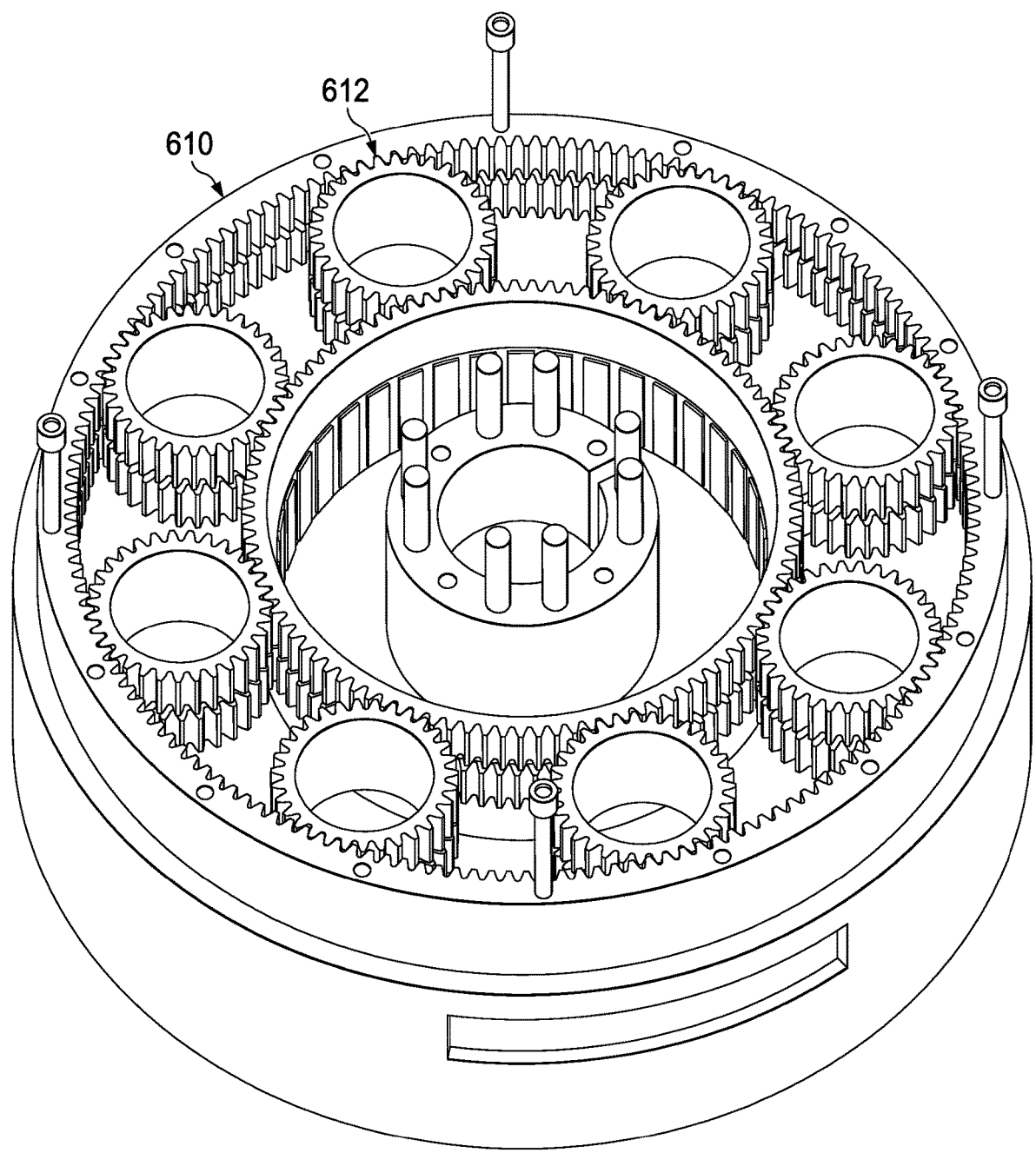
Figure 14E:
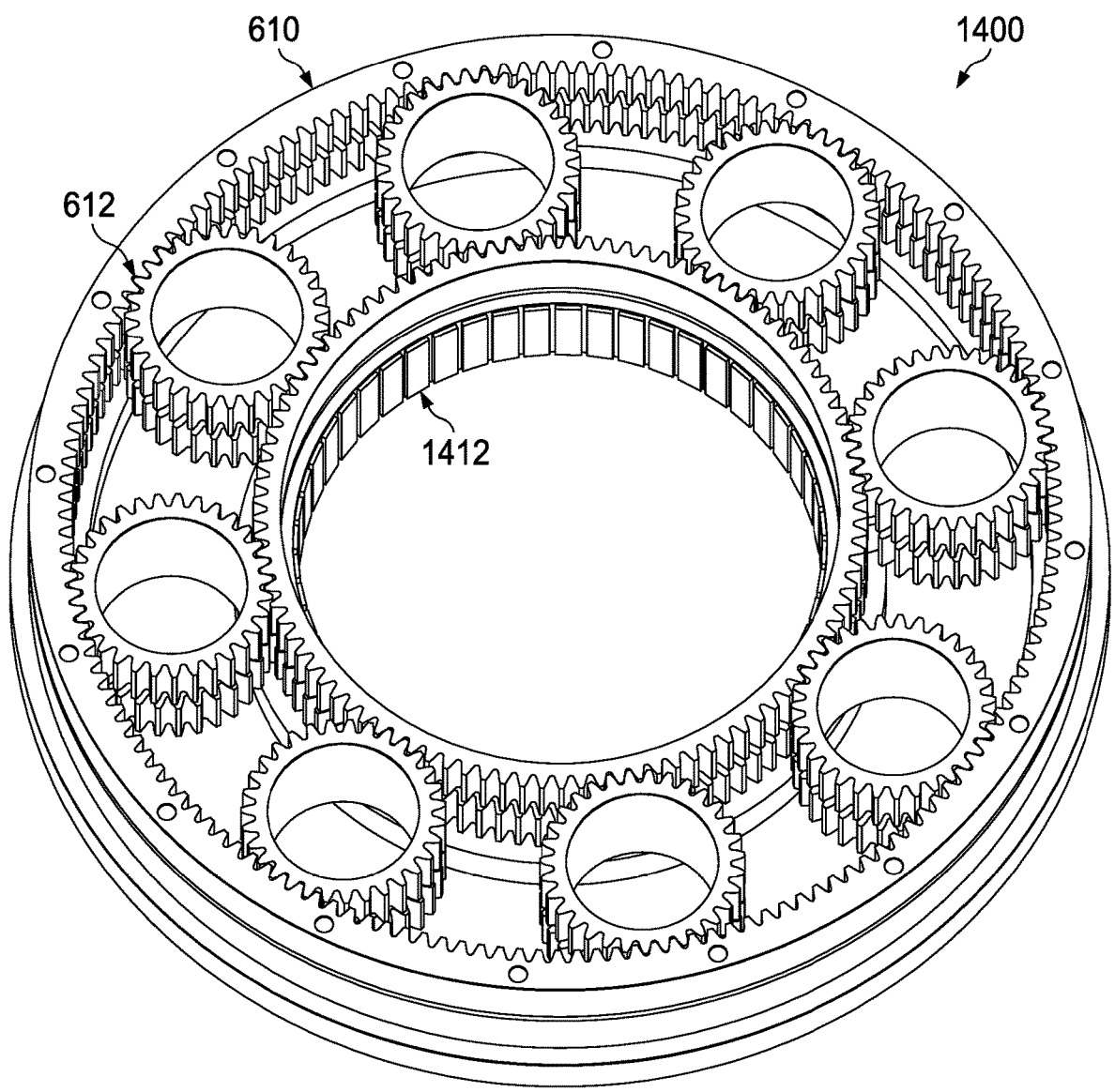

III. Third Embodiment: Series Elastic Actuator Comprising a Bearingless Planetary Gearbox FIGS. 14A-14D illustrate a series elastic actuator 1400 including a gearbox 600 (e.g., a high reduction ratio (1:101) gearbox). This example features no bearing (apart from the motor bearing) and the ring gear 604 is immobilized through a custom rotary springs (e.g., SEA springs 1402). The SEA springs 1402 are mounted to the brushless DC (BLDC) stator 1404 in a motor 1406 via SEA mounts 1410 and a potentiometer (or encoder) 1408 measures the SEA springs 1402 deflection. The motor 1406 further comprises a brushless DC rotor 1412. The second ring gear 610 rotates in response to the motor rotor 1412 driving the first sun gear 602. The potentiometer 1408 measures the deflection of the SEA springs 1402 so that the actuator output torque on ring gear 610 can be estimated. FIGS. 14B-14C illustrate successfully implemented working embodiments. The bearingless planetary gearbox simplicity combined with improved compound gear planet manufacturing allows removal of the assembly alignment holes 900 as shown in FIGS. 14B-14E.

Figure 15C:
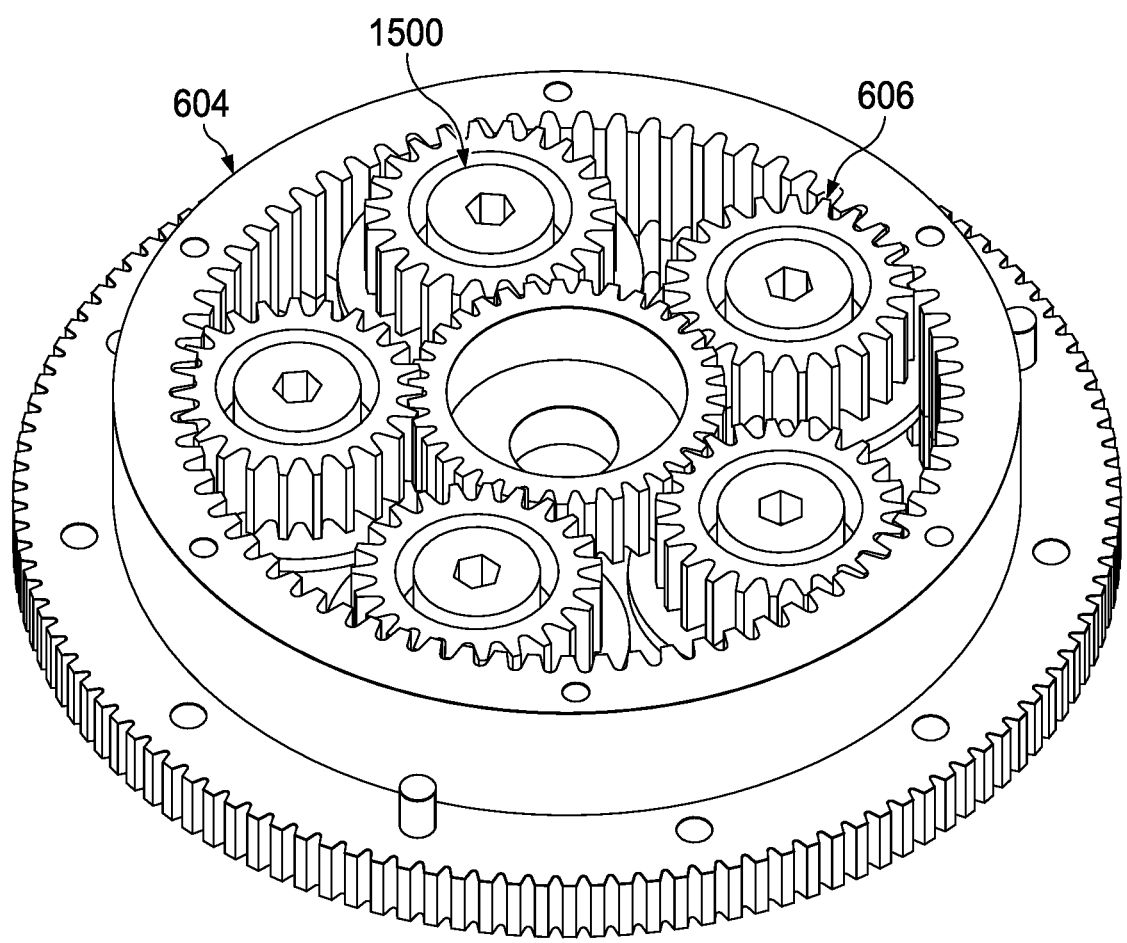

IV. Fourth Embodiment: Series Elastic Actuator Comprising a Bearingless Planetary Gearbox Built With Off-the-Shelf Components FIGS. 15A-15C illustrate a gearbox according to embodiments of the present invention constructed using off the shelf gearing components. FIGS. 15A-15B are CAD schematics, and FIG. 15C is a photograph of a fabricated gearbox, illustrating the compound planets 614 comprise two separate gears 606, 612 having the same bore and fixed to each other using a shoulder screw 1500. A nut and a bevel washer ensures that the frictional coupling force between the two gear faces is large enough and no slippage occurs. Trust bearings are used to axially constrain the planets. The gearbox has reduction ratio 1:35, has very low friction and is backdrivable.

The commercial gears have relatively high normal backlash. However, the gearbox itself is backlash-free because the backlash is removed upon assembly using a fixture. Thus, the main advantage of this design approach is that it allows the construction of high accuracy gearbox using low accuracy gearing components. The gearbox has been successfully tested.

Figure 15D:
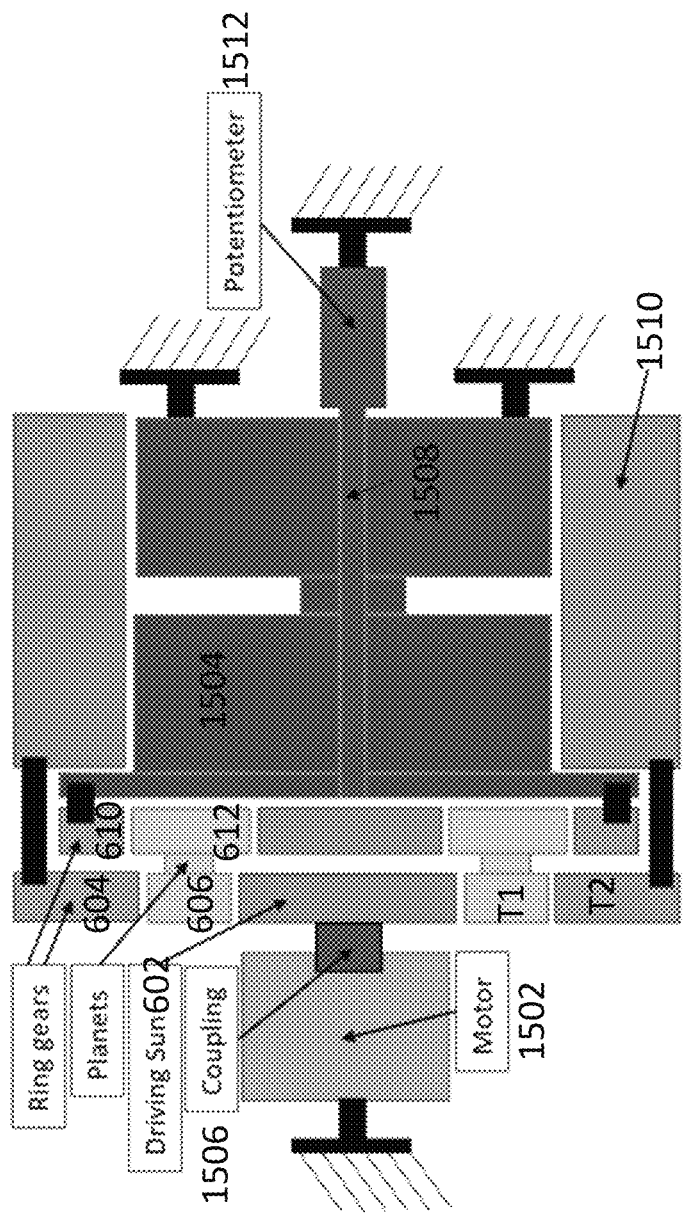
Figure 15E:
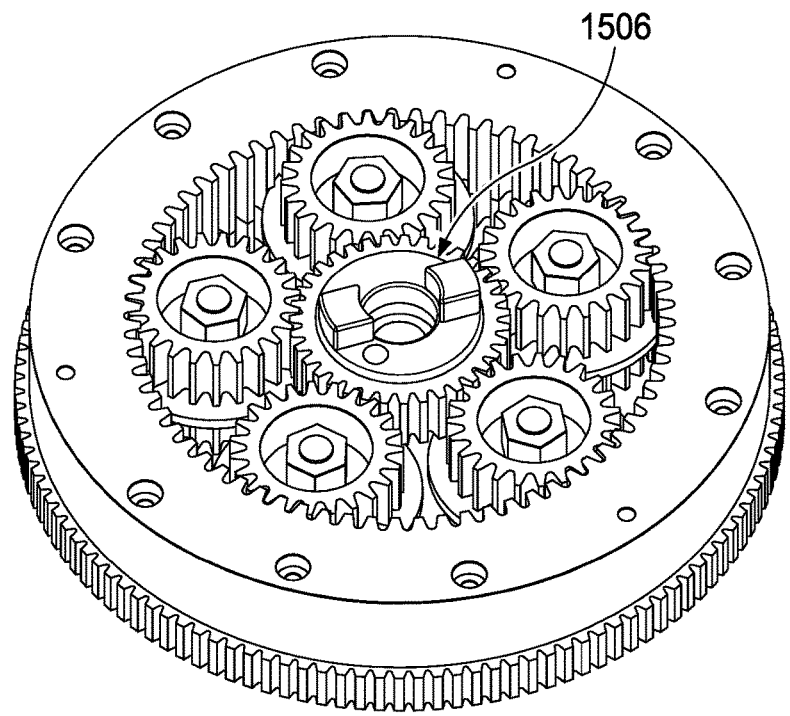
Figure 15F:
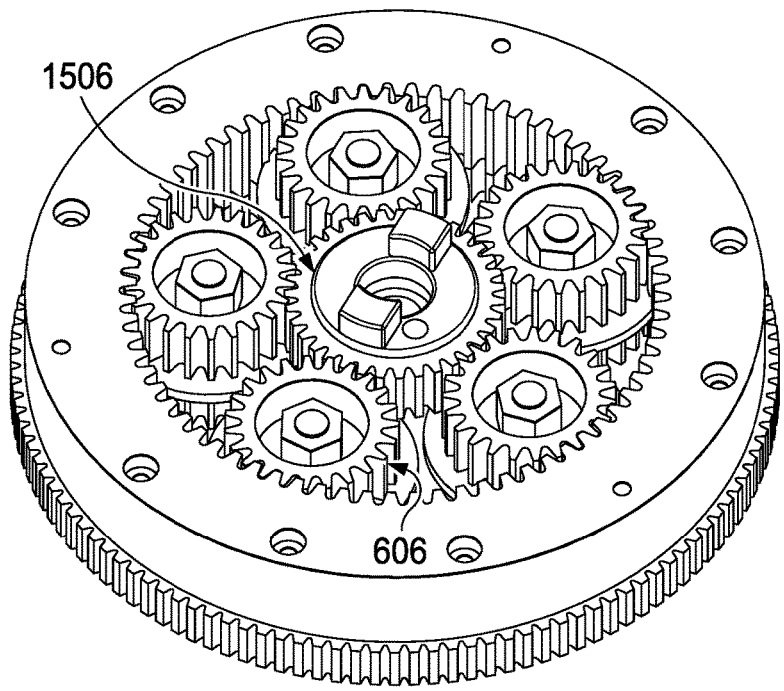

FIG. 15D illustrates a similar series elastic actuator as shown in FIGS. 14A-14E, comprising the bearingless planetary gearbox of FIGS. 15A-15C. FIG. 15D illustrates the gearbox coupled to a conventional inner rotor motor 1502 and an output shaft 1510. A custom series elastic spring 1504 immobilizes ring gear 610. The motor 1502 is connected to the first (driving) sun gear 602 using a coupling 1506 (see also FIGS. 15E and 15F) so that the motor 1502 drives the first sun gear 602. The output shaft 1510 is connected to the first ring gear 604. The first sun gear 602 transfers torque T1 from the motor 1502 to the first set of planetary gears 606 and the first set of planet gears 606 transfer at least a portion T2 of the torque T1 to the first ring gear 604. The first ring gear 604 drives the output shaft 1510 (i.e., the first ring gear 604 is the gearbox output in this embodiment).

This SEA design variation demonstrates the versatility of the bearingless planetary gearbox as either of the ring gears 604 or 610 can be immobilized and the other used as the gearbox output.

In the embodiment of FIG. 15D, the custom series elastic spring 1504 is rotatably connected to a potentiometer or encoder 1512 by shaft 1508 so that, the SEA springs 1504 deflection can be measured. The spring 1504 measured deflection can be used to evaluate the actuator output torque on ring gear 604.

V. Example Assembly Process Steps

FIG. 16 is a flowchart illustrating a method of making a gearbox according to one or more examples (referring also to FIGS. 6A-6B, 10A-10B, FIGS. 12-15).

Block 1600 represents combining a first set of planet gears 606 with a second set of planet gears 612. The first set of planet gears 606 comprises gears indexed with an integer i, $1 \leq i \leq n$. The second set of planet gears 612 also comprises n gears indexed with the integer i. For each of the i, the $i^{th}$ gear in the first set of planet gears is fixed to, or combined with, the $i^{th}$ gear in the second set of planet gears so that the $i^{th}$ gear in the first set and the $i^{th}$ gear in the second set rotate together coaxially.

In one or more examples, the $i^{th}$ gear in the first set and $i^{th}$ gear in the second set form a solid compound gear 614 (alternatively referred to as a gear cluster), as illustrated in FIG. 6B.

In one or more examples, the n solid compound gears are identical, and the $i^{th}$ gear in the first set of planet gears is aligned to the $i^{th}$ gear in the second set of planet gears.

In one or more examples, the $i^{th}$ gear in the first set and the $i^{th}$ gear in the second set of planet gears are connected by a flexible or a rigid coupling.

In one or more examples, the $i^{th}$ gear in the first set and the $i^{th}$ gear in the second set of planet gears are connected with a shaft fixture as illustrated in FIGS. 15A-15E. For example, the gearbox may comprise a screw 1500 fixing the $i^{th}$ gear in the first set to the $i^{th}$ gear in the second set of planet gears. In this case, the $i^{th}$ gear in the first set and the $i^{th}$ gear in the second set of planet gears are axially mated to each other through a frictional coupling.

Block 1602 represents positioning the first set of planet gears 606 and the second set of planet gears 612, wherein the first set of planet gears 606 mesh with an outside of a first sun gear 602 and with an inside of a first ring gear 604, and the second set of planet gears 612 mesh with an inside of the second ring gear 610 and an outside of the second sun gear 608.

Block 1604 represents the end result, a gearbox (e.g., as illustrated in FIGS. 6A-6B).

In various examples, a radial force results from meshing of the second ring gear 610 with the second planet gears 612. That force can be supported by the second sun gear 608 so as to keep the axes of planet gears 606, 612, sun gears 602, 608 and ring gears parallel. In various examples, the second sun gear 608 provides the radial support for the planet gears 606, 612 through the meshing of the planet gears 612 and the second ring gear 610 to the second sun gear 608.

In one or more examples, the gearbox is a high reduction bearingless gearbox which can achieve high reduction ratios in a single composite stage.

The gearbox may be embodied in many ways including, but not limited to, the following examples.

Block 1606 represents optionally coupling the gearbox to an application.

In one example, a motor (1000, 1002, 1200, 1316, 1406) is connected to the first sun gear 602 so as to drive the first sun gear 602, the first ring gear 604 is immobilized, the first sun gear 602 transfers torque T1 from the motor to the first set of planet gears 606, the first set of planet gears 606 transfer at least a portion of the torque T1 to the second set of the planet gears 612, and the second set of the planet gears 612 transfer at least a portion T2 of the at least a portion of the torque T1 to the second ring gear 610. Since the first ring gear 604 is immobilized, the first ring gear 604 is not free to rotate and the second ring gear 610) is the output (e.g., connected to an output shaft). However, the remaining gears (sun gear 602, second ring gear 610, planet gears 606, 612, and second sun gear 608) can float because they are non-grounded (i.e., not rigidly connected, e.g., not attached with a fastener, screw, pin, or press fit).

In another example, the motor 1502 is connected to the first (driving) sun gear 602 so that the motor 1502 drives the first sun gear 602, the first ring gear 604 is the output, and the second ring gear 610 is immobilized. An output shaft 1510 is connected to the first ring gear 604. The first sun gear 602 transfers torque T1 from the motor 1502 to the first set of planetary gears 606 and the first set of planet gears 606 transfer at least a portion T2 of the torque T1 to the first ring gear 604. The first ring gear 604 drives the output shaft 1510. In this case, the first ring gear 604 is the output since the second ring gear 610 is stationary/immobilized (i.e., not free to rotate). However, the remaining gears (first sun gear 602, first ring gear 604, planet gears 606, 612, and second sun gear 608) can float because they are non-grounded (i.e., not rigidly connected, or not attached with a fastener, screw, pin, or press fit).

In one or more examples, the output shaft 1504 is rotatably connected to a potentiometer or encoder 1512 to evaluate output torque on ring gear 604 or 610.

In one or more examples illustrated in FIGS. 10A-10B, 11 and 14, the motor comprises an outrunner motor 1002 including an outer rotor 1004 on an outside of a stator 1006, and the outer rotor 1004 is attached and/or integrated to the first sun gear 602 so as to directly drive the first sun gear 602. The outrunner rotor 1004 may be attached on an inside of the sun gear 602 (e.g., the first sun gear 602 may comprise an annulus forming a ring around an outer surface of the rotor 1412, 1004). In one or more examples, the fabricated device gearmotor comprises/consists of an integrated outer rotor motor 1002 in a bearingless planetary gearbox 600.

In one or more examples, the gearbox 600 and/or motor 1406, 1502 (comprising rotor and stator) described herein are disposed in an actuator so that the actuator comprises the motor rotor 1412 coupled to the first sun gear 602 and the motor stator 1404 electromagnetically coupled to the motor rotor 1412. When the stator 1404 is energized, the rotor 1412 turns, thereby transferring torque T1 to the first sun gear 602. As described herein, the gearbox 600 in the actuator transfers a portion of the torque T1 to the output ring comprising the second ring gear 610 (when the first ring gear 604 is immobilized, as discussed in reference to FIG. 14 above) or to the output ring comprising the first ring gear 604 (when the second ring gear 610 is immobilized, as discussed in reference to FIG. 15 above). Moreover, as illustrated herein, the first sun gear 602 in the actuator may comprise an annulus forming a ring around an outer surface of the rotor 1412.

In one or more examples, the actuator is a robotic joint and the second ring 610 or first ring 604 gear are coupled to a joint rotor 1312 so as drive the joint rotor 1312. For example, the output shaft 1322 may comprise a joint rotor 1312 connected to the second ring gear 610 (or first ring gear 604).

In one or more gearbox, motor, or actuator embodiments described herein, a casing 1320 (e.g., joint stator 1314) may be coupled to the first ring gear 604 (or the second ring gear 610) so as to immobilize the first ring gear 604 (e.g., when the second ring gear is the output) or immobilize the second ring gear 610 (e.g., when the first ring gear is the output).

In one or more of the motor or actuator embodiments described herein, a bearing support assembly 1308a (e.g., bearings 1308) is attached to the output shaft 1322, a bearing support assembly 1420 is attached to the motor rotor 1412, and a motor stator 1306 is coupled to the casing 1320 so as to immobilize the motor stator 1306. Bearing support assembly 1420 may be used to radially and axially constrain the motor rotor 1412 with respect to the motor stator 1404. Bearing support assembly 1308a may be used to radially and axially constrain a joint rotor 1312 with respect to a joint stator 1314.

A series elastic actuator (SEA) spring 1402 may be used to immobilize ring gear 604 or 610 to provide shock tolerance in the actuator. The spring 1402 eliminates/reduces the reflected inertia and allows force control. That is, the spring deflection is measured so that the output torque can be measured using Hook's law.

Alternatively, the series elastic actuator (SEA) spring 1402 can be used to connect the gearbox output ring gear to the joint output shaft 1322 or 1510.

In various embodiments, the gearbox 600 in the actuator is backdrivable (e.g., the gearbox output ring gear can be rotated with respect to the immobilized ring gear when the actuator is not activated). The floating nature of the bearingless planetary gearbox facilitates its backdrivability.

ADVANTAGES AND IMPROVEMENTS

Embodiments of the novel bearingless gearbox presented herein provide advantages in terms of compactness, weight and torque performance. The floating nature of the components make high reduction gearbox embodiments attractive for realistic high performance robotic applications. The gearbox applicability is also significantly improved, as all components can be manufactured with standard machining techniques. Moreover, in various examples, the driving electric motor can be compactly embedded in the gearbox so that the resulting actuator can be efficiently built-in robotic joints.

REFERENCES

The following references are incorporated by reference herein.

[1] S. Seok, A. Wang, D. Often, J. Lang, S. Kim, "Actuator Design for High Force Proprioceptive Control in Fast Legged Locomotion" *ISER,* 2012.

[2] K. Ueura, R. Slatter, "On the Kinematic Error in Harmonic Drive Gears" 8th ESMATS, 1999.

[3] F. Ghorbel, P. Gandhi, F. Alpeter, "Development of the harmonic drive gear for space applications" *ASME J Mech.,* 1998.

[4] R. Dhaouadi, F. Ghorbel, "Modeling and Analysis of Hysteresis in Harmonic Drive Gears" *Sys. Analysis Model Simul,* 2003.

[5] W. Seyfferth, A. Maghzal, J. Angeles, "Nonlinear Modeling and Parameter Identification of Harmonic Drive Robotic Transmissions" *ICRA*, 1995.
[6] T. Tuttle, W. Seering "Modeling a Harmonic Drive Gear Transmission" *ICRA*, 1993.
[7] D. Yang, J. Blanche, "Design and Application Guidelines for Cycloid Drives with Machining Tolerances" *Mech. Mach. Theory*, 1990.
[8] J. Sensiger, "Unified Approach to Cycloid Drive Profile, Stress and Efficiency Optimization" *ASME J. Mech.*, 2010
[9] K. Seweryn, K. Grassmann, M. Ciesielka, T. Rybus, M. Turek, "Optimization of the Robotic Joint Equipped with Epicycloidal Gear and Direct Drive for Space Application". *ASMEI Mech.*, 2010
[10] R. Krishnan, "Permanent Magnet Synchronous and Brushless DC Motor Drives" *CRC Press*, 2010.
[11] Grote, Antonsson (Eds.), "Springer Handbook of Mechanical Engineering", 2009.
[12] E. Brassitos, C. Mavroidis, "Kinematics Analysis and Design Considerations of the Gear Bearing Drive" *Advances in Mechanisms, Robotics and Design Education and Research Volume* 14 of the series Mechanisms and Machine Science pp 159-175, 2013.
[13] B. Weinberg, J. Vranish, C. Mavroidis, "Gear Bearing Drive", U.S. Pat. No. 8,016,893, 2011.
[14] E. Brassitos, Steven Dubowsky, "Compact Drive System for Planetary Rovers and Space Manipulators", *IEEE AIM*, 2015.
[15] KHK Gears, "Gear Technical Reference, http://khkgears.net/.
[16] R. Budynas, J. Nisbett, "Shigley's Mechanical Engineering Design", *McGraw Hill*, 2011.
[17] Grote, Antonsson (Eds.), "Springer Handbook of Mechanical Engineering", 2009.
[18] Further information on one or more embodiments of the present invention can be found in "Design and Analysis of the Bearingless Planetary Gearbox" by Nikola Georgiev and Joel Burdick, 2017 IEEE/RSJ International Conference on Intelligent Robots and Systems. Sep. 24-28, 2017, Vancouver, BC, Canada.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A planetary gearbox, comprising:
a first sun gear;
a first ring gear concentric with the first sun gear;
a first set of first planet gears meshing with an outside of the first sun gear and with an inside of the first ring gear, wherein the first set of first planet gears comprises a number n of the first planet gears and n is an integer;
a second sun gear concentric with the first sun gear;
a second ring gear concentric with the second sun gear;
a second set of second planet gears meshing with an inside of the second ring gear and an outside of the second sun gear, wherein:
the second set of second planet gears comprises the number n of the second planet gears,
each of the first gears in the first set of first planet gears is fixed to, connected or combined with an associated one of the second planet gears in the second set of second planet gears so that the $i^{th}$ first planet gear in the first set and the $i^{th}$ second planet gear in the second set rotate together coaxially, wherein $1 \le i \le n$ and i is an integer,
the gearbox does not include a planet carrier, the first set of first planet gears being supported during operation of the gearbox by the meshing the first sun gear and the first ring gear, and the second set of second planet gears being supported during the operation of the gearbox by the meshing with the second sun gear and the second ring gear, and
the positions of the planet gears are determined by a factorization of $z_a + z_b$ and a factorization of $$\frac{z_a z_e - z_b z_a}{g}$$

where g is the greatest common divider of $z_e z_g - z_b z_f$ and $z_g$,
$z_a$ is the number of teeth on the first sun gear,
$z_b$ is the number of teeth on the first ring gear,
$z_e$ is the number of teeth on the second ring gear,
$z_g$ is the number of teeth on each of the first planet gears, and
$z_f$ is the number of teeth on each of the second planet gears.

2. The planetary gearbox of claim 1, wherein:
the n first gears in the first set are the same and each have a first diameter, and
the n second gears in the second set are the same and each have a second diameter larger or smaller than the first diameter.

3. The planetary gearbox of claim 1, wherein:
the $i^{th}$ first planet gear in the first set and $i^{th}$ second planet gear in the second set form a solid compound gear.

4. The planetary gearbox of claim 3, wherein:
the n solid compound gears are identical,
the $i^{th}$ first planet gear in the first set of first planet gears is aligned to the $i^{th}$ second planet gear, and
$1 \le i \le n$.

5. The planetary gearbox of claim 1, wherein:
the $i^{th}$ first planet gear in the first set and $i^{th}$ second planet gear in the second set are connected through a flexible or rigid coupling.

6. The planetary gearbox of claim 1, wherein:
the $i^{th}$ first planet gear in the first set and the $i^{th}$ second planet gear in the second set are connected with a shaft fixture, and
the $i^{th}$ first planet gear in the first set and the $i^{th}$ second planet gear in the second set of are axially mated to each other through a frictional coupling.

7. The planetary gearbox of claim 1, further comprising a screw fixing the $i^{th}$ first planet gear in the first set to the $i^{th}$ second planet gear in the second set.

8. An actuator comprising the planetary gearbox of claim 1, further comprising:
a motor including a motor rotor and a motor stator, wherein:
the motor rotor is coupled to the first sun gear,
the motor stator is electromagnetically coupled to the motor rotor, the motor comprises an outrunner motor, wherein the motor rotor is an outer rotor on an outside of the motor stator, and the outer rotor is attached to the first sun gear so as to directly drive the first sun gear.

9. The actuator of claim 8, wherein the first sun gear comprises an annulus forming a ring around an outer surface of the outer rotor.

10. The actuator of claim 9, wherein the actuator is a robotic joint.

11. An actuator comprising the planetary gearbox of claim 1, further comprising:
a motor including a motor rotor and a motor stator, wherein:
the motor rotor is coupled to the first sun gear,
the motor stator is electromagnetically coupled to the motor rotor,
the first ring gear is immobilized,
the first sun gear transfers first torque from the motor to the first set of first planet gears,
the first set of first planet gears transfer second torque comprising at least a portion of the first torque to the second set of the second planet gears, and
the second set of the second planet gears transfer at least a portion of the second torque to the second ring gear.

12. The actuator of claim 11, further comprising:
a casing coupled to the first ring gear so as to immobilize the first ring gear; and
an output shaft connected to the second ring gear.

13. The actuator of claim 12, further comprising:
a bearing support assembly for the output shaft;
a bearing support assembly for the motor rotor; and
the motor stator coupled to the casing so as to immobilize the motor stator.

14. The planetary gearbox of claim 1, wherein:
the first set of first planet gears are not constrained in a radial direction except by their meshing with the first sun gear and the first ring gear, and
the second set of second planet gears are not constrained in a radial direction except by their meshing with the second sun gear and the second ring gear.

15. An actuator, comprising:
a planetary gearbox, including:
a first sun gear;
a first ring gear concentric with the first sun gear;
a first set of first planet gears meshing with an outside of the first sun gear and with an inside of the first ring gear, wherein the first set of first planet gears comprises a number n of the first planet gears and n is an integer;
a second sun gear concentric with the first sun gear;
a second ring gear concentric with the second sun gear;
a second set of second planet gears meshing with an inside of the second ring gear and an outside of the second sun gear, wherein:
the second set of second planet gears comprises the number n of the second planet gears,
each of the first gears in the first set of first planet gears is fixed to, connected or combined with an associated one of the second planet gears in the second set of second planet gears so that the $i^{th}$ first planet gear in the first set and the $i^{th}$ second planet gear in the second set rotate together coaxially, wherein $1 \leq i \leq n$ and i is an integer, and
the gearbox does not include a planet carrier, the first set of first planet gears being supported during operation of the gearbox by the meshing the first sun gear and the first ring gear, and the second set of second planet gears being supported during the operation of the gearbox by the meshing with the second sun gear and the second ring gear;
a motor connected to the first sun gear so as to drive the first sun gear, wherein:
the motor includes a motor rotor and a motor stator,
the motor rotor is coupled to the first sun gear;
the motor stator is electromagnetically coupled to the motor rotor,
the second ring gear is immobilized,
the first sun gear transfers torque from the motor to the first set of first planet gears, and
the first set of the first planet gears transfer at least a portion of the torque to the first ring gear.

16. The actuator of claim 15, further comprising:
a casing coupled to the second ring gear so as to immobilize the second ring gear; and
an output shaft connected to the first ring gear.

17. The actuator of claim 16, further comprising:
a bearing support assembly for the output shaft;
a bearing support assembly for the motor rotor; and
the motor stator coupled to the casing so as to immobilize the motor stator.

18. A method of making an actuator, comprising:
coupling a motor to a planetary gearbox, the planetary gearbox including:
a first sun gear;
a first ring gear concentric with the first sun gear;
a first set of first planet gears meshing with an outside of the first sun gear and with an inside of the first ring gear, wherein the first set of first planet gears comprises a number n of the first planet gears;
a second sun gear concentric with the first sun gear;
a second ring gear concentric with the second sun gear; and
a second set of second planet gears meshing with an inside of the second ring gear and an outside of the second sun gear, wherein:
the second set of planet second gears comprises the number n of second planet gears,
each of the first planet gears in the first set of planet gears is fixed to, connected or combined with an associated one of the second planet gears in the second set of second planet gears so that the $i^{th}$ gear in the first set and the $i^{th}$ gear in the second set rotate together coaxially and wherein $1 \leq i \leq n$ and i is an integer,
the first set of first planet gears are not constrained in a radial direction except by their meshing with the first sun gear and the first ring gear,
the second set of second planet gears are not constrained in a radial direction except by their meshing with the second sun gear and the second ring gear,
the motor is connected to the first sun gear so as to drive the first sun gear, wherein:
the motor includes a motor rotor and a motor stator,
the motor rotor is coupled to the first sun gear;
the motor stator is electromagnetically coupled to the motor rotor,
the second ring gear is immobilized,
the first sun gear transfers torque from the motor to the first set of first planet gears, and
the first set of the first planet gears transfer at least a portion of the torque to the first ring gear.

19. The method of claim 18, further comprising positioning the planet gears wherein:

the positions of the planet gears are determined by a factorization of $z_a+z_b$ and a factorization of $$\frac{z_e z_a - z_b z_a}{g}$$

where g is the greatest common divider of $z_e z_g - z_b z_f$ and $z_g$,
$z_a$ is the number of teeth on the first sun gear,
$z_b$ is the number of teeth on the first ring gear,
$z_e$ is the number of teeth on the second ring gear,
$z_g$ is the number of teeth on each of the first planet gears, and
$z_f$ is the number of teeth on each of the second planet gears.

20. The method of claim 18, further comprising:
coupling a casing to the second ring gear so as to immobilize the second ring gear; and
connecting an output shaft to the first ring gear.

* * * * *